(12) United States Patent
Kawashiri

(10) Patent No.: US 11,279,342 B2
(45) Date of Patent: Mar. 22, 2022

(54) VEHICLE DRIVING APPARATUS

(71) Applicant: SUBARU CORPORATION, Tokyo (JP)

(72) Inventor: Takahiro Kawashiri, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/060,662

(22) Filed: Oct. 1, 2020

(65) Prior Publication Data
US 2021/0188249 A1 Jun. 24, 2021

(30) Foreign Application Priority Data

Dec. 19, 2019 (JP) .............................. JP2019-228731

(51) Int. Cl.
| | | |
|---|---|---|
| *B60W 20/40* | (2016.01) | |
| *B60W 10/08* | (2006.01) | |
| *B60W 10/10* | (2012.01) | |
| *B60W 10/02* | (2006.01) | |

(Continued)

(52) U.S. Cl.
CPC ............ *B60W 20/40* (2013.01); *B60W 10/02* (2013.01); *B60W 10/06* (2013.01); *B60W 10/08* (2013.01); *B60W 10/10* (2013.01); B60K 2006/4825 (2013.01); B60W 2510/0208 (2013.01); B60W 2510/0638 (2013.01); B60W 2510/08 (2013.01);

(Continued)

(58) Field of Classification Search
CPC ...... B60W 20/40; B60W 10/02; B60W 10/08; B60W 10/10; B60W 10/06; B60W 2510/0638; B60W 2510/08; B60W 2510/251; B60W 2510/0208; B60W 2710/021; B60W 2710/0644; B60W 2710/08; Y10T 477/26; B60K 2006/4825

See application file for complete search history.

(56) References Cited

U.S. PATENT DOCUMENTS

| | | | |
|---|---|---|---|
| 2013/0040778 A1 | 2/2013 | Schulte et al. | |
| 2016/0280217 A1* | 9/2016 | Sato ....................... | B60W 20/40 |

(Continued)

FOREIGN PATENT DOCUMENTS

| | | | | |
|---|---|---|---|---|
| CN | 109421729 A | * | 3/2019 | ............... B60K 6/38 |
| JP | 2013-035544 A | | 2/2013 | |

(Continued)

*Primary Examiner* — Roger L Pang
(74) *Attorney, Agent, or Firm* — McGinn I.P. Law Group, PLLC

(57) ABSTRACT

A vehicle driving apparatus for a vehicle with wheels includes an engine, a transmission mechanism, an input shaft, a power generation motor, and a motor clutch. The transmission mechanism is disposed between the engine and the wheels. The input shaft is disposed between the engine and the transmission mechanism and coupled to a crank shaft of the engine via a damper mechanism. The power generation motor is disposed between the engine and the transmission mechanism and includes a hollow rotor through which the input shaft extends. The motor clutch is switched between an engaged state and a released state. When being the engaged state, the motor clutch couples the input shaft and the hollow rotor. When being in the released state, the motor clutch releases coupling between the input shaft and the hollow rotor.

10 Claims, 16 Drawing Sheets

(51) Int. Cl.
 *B60W 10/06* (2006.01)
 *B60K 6/48* (2007.10)

(52) U.S. Cl.
 CPC ............... *B60W 2710/021* (2013.01); *B60W 2710/0644* (2013.01); *B60W 2710/08* (2013.01)

(56) References Cited

U.S. PATENT DOCUMENTS

2016/0297448 A1* 10/2016 Ito ..................... B60W 10/06
2018/0105162 A1* 4/2018 Katakura ............... B60K 6/387

FOREIGN PATENT DOCUMENTS

JP  2017-165260 A  9/2017
JP  2018-052320 A  4/2018

* cited by examiner

VEHICLE DRIVING APPARATUS

CROSS-REFERENCE TO RELATED APPLICATIONS

The present application claims priority from Japanese Patent Application No. 2019-228731 filed on Dec. 19, 2019, the entire contents of which are hereby incorporated by reference.

BACKGROUND

The technology relates to a vehicle driving apparatus including an engine.

A vehicle such as an automobile includes a power train provided with an engine and a transmission mechanism. Reference is made to Japanese Unexamined Patent Application Publication Nos. 2013-35544, 2017-165260, and 2018-52320. The engine is an internal combustion engine involving torque fluctuations that can cause a torsional vibration. The torsional vibration can be transmitted from the engine to the transmission mechanism. Such a torsional vibration transmitted to the transmission mechanism can generate noises such as so-called gear rattle noises or booming noises. To reduce the torsional vibration to be transmitted from the engine to the transmission mechanism, a damper mechanism is incorporated between the engine and the transmission mechanism.

SUMMARY

An aspect of the technology provides a vehicle driving apparatus for a vehicle with wheels. The vehicle driving apparatus includes an engine, a transmission mechanism, an input shaft, a power generation motor, and a motor clutch. The transmission mechanism is disposed between the engine and the wheels. The input shaft is disposed between the engine and the transmission mechanism and coupled to a crank shaft of the engine via a damper mechanism. The power generation motor is disposed between the engine and the transmission mechanism and includes a hollow rotor through which the input shaft extends. The motor clutch is configured to be switched between an engaged state and a released state. When being in the engaged state, the motor clutch couples the input shaft and the hollow rotor. When being in the released state, the motor clutch releases coupling between the input shaft and the hollow rotor.

BRIEF DESCRIPTION OF THE DRAWINGS

The accompanying drawings are included to provide a further understanding of the technology and are incorporated in and constitute a part of this specification. The drawings illustrate exemplary embodiments and, together with the specification, serve to explain the principles of the technology.

DETAILED DESCRIPTION

A power train mounted in a vehicle includes an electric-power generation motor incorporated between an engine and a transmission mechanism in some cases. The power train including such an electric-power generation motor can experience a large increase in inertia of a power transmission passage coupling the engine and the transmission mechanism, producing resonance in a specific low-revolution range due to a torsional vibration. To prevent the torsional resonance and reduce noises such as gear rattle noises, the power train including the electric-power generation motor incorporated between the engine and the transmission mechanism has been required to have an increased number of damper mechanisms or a complicated damper mechanism. However, such an increase in the number of damper mechanisms, for example, can increase the size and cost of the power train. It is therefore desired to prevent the torsional resonance from occurring with a simple structure.

It is desirable to prevent torsional resonance from occurring with a simple structure.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Power Train

Figure 1:
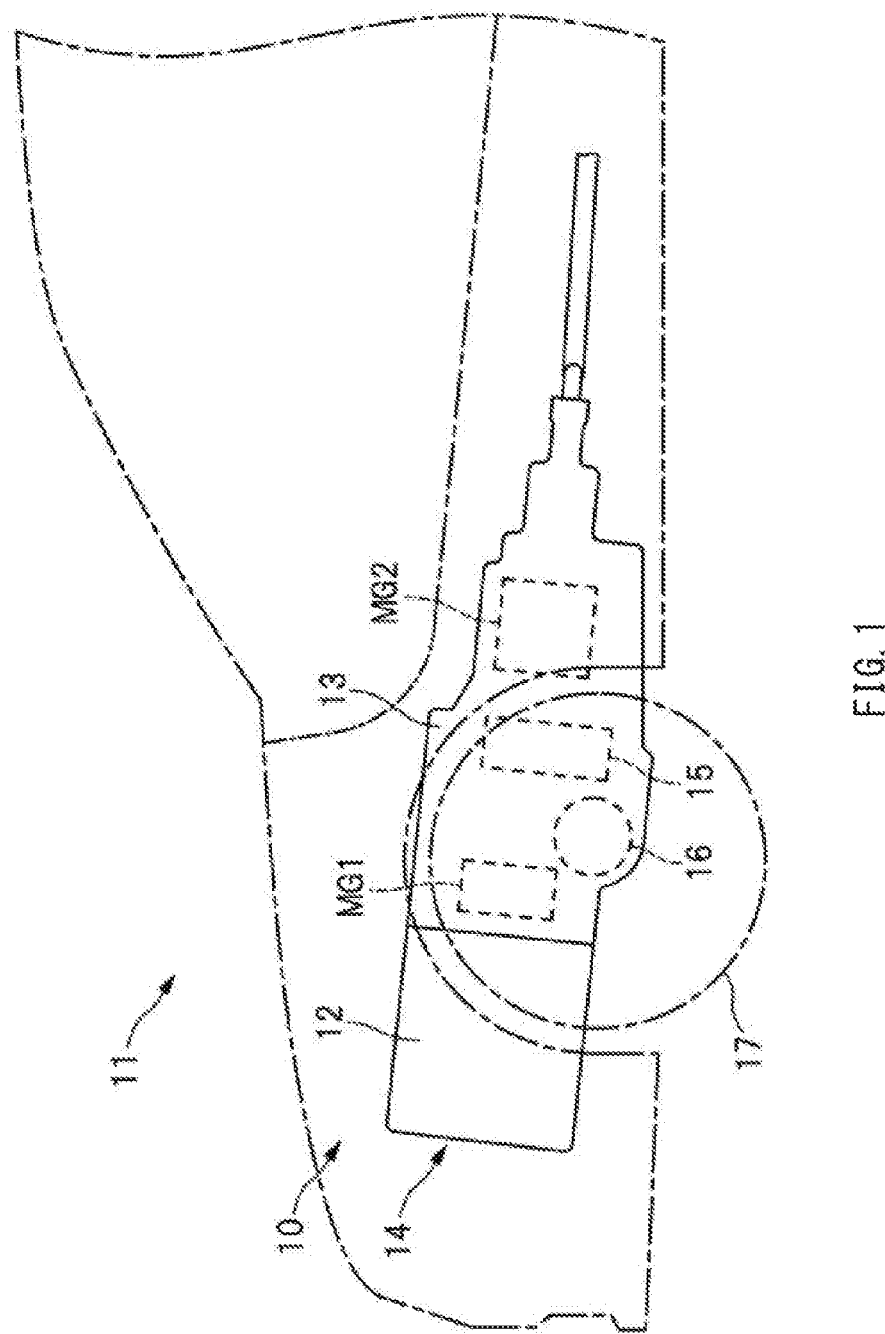
FIG. 1 is a schematic view of a vehicle provided with a vehicle driving apparatus according to one example embodiment of the technology.

FIG. 1 illustrates a vehicle 11 including a vehicle driving apparatus 10 according to an example embodiment of the technology. With reference to FIG. 1, the vehicle 11 may include a longitudinally mounted power train 14. The power train 14 may include an engine 12 and a transmission 13. The transmission 13 may include a first motor generator MG1, a second motor generator MG2, and a continuously variable transmission 15. The transmission 13 may further include a differential mechanism 16. The differential mechanism 16 may be coupled to a front wheel 17 via a non-illustrated drive shaft, for example. In one embodiment, the front wheel 17 and a rear wheel 18 may serve as "wheels". The vehicle driving apparatus 10 according to the example embodiment may include the power train 14 and a control system 70 described below.

Figure 2:
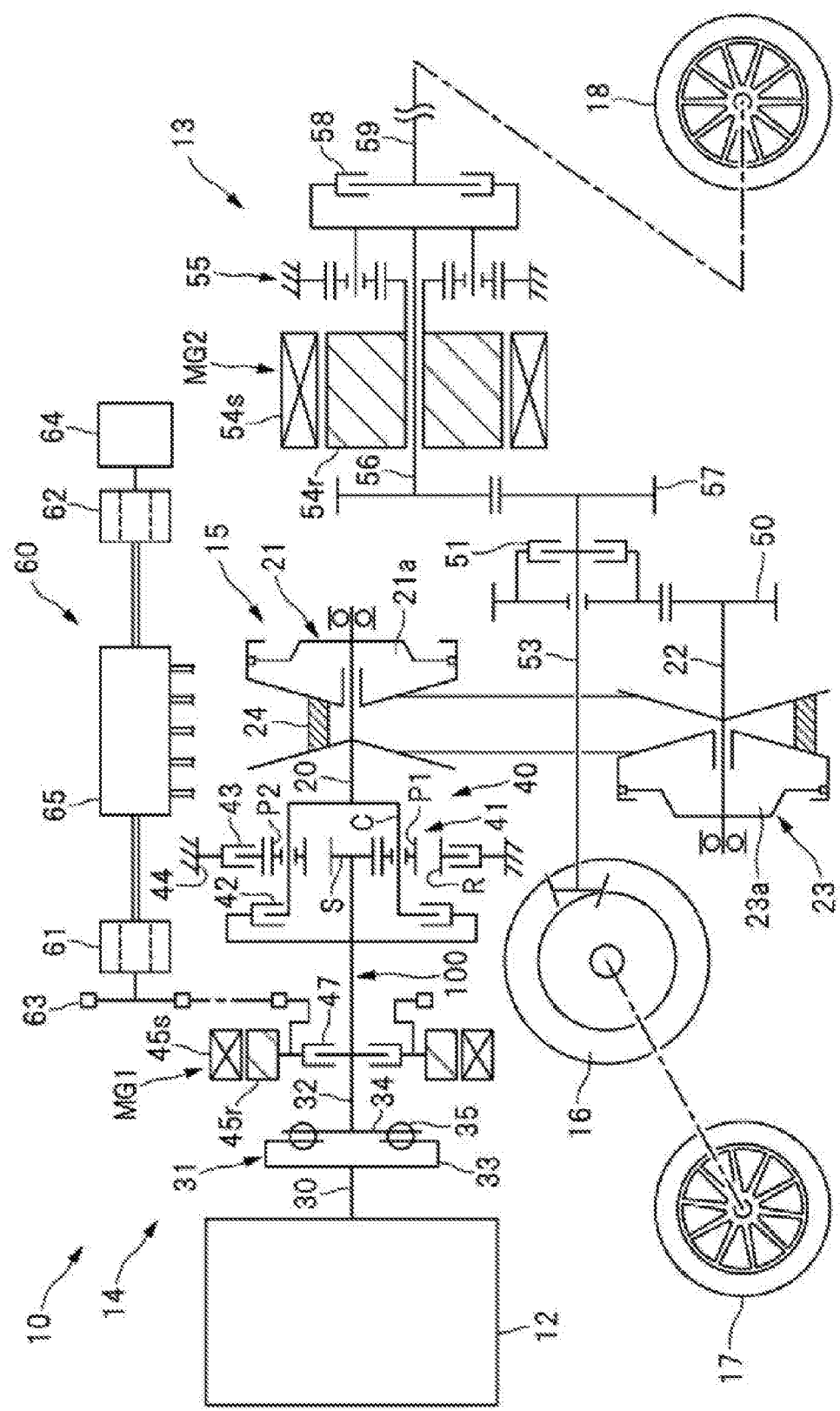
FIG. 2 is a schematic diagram illustrating an example configuration of a power train.

FIG. 2 is a schematic diagram illustrating an example configuration of the power train 14. With reference to FIG. 2, the continuously variable transmission 15 is disposed between the engine 12 and the wheels 17 and 18. In one embodiment, the continuously variable transmission 15 may serve as a "transmission mechanism". The continuously variable transmission 15 may include a primary pulley 21 disposed on a primary shaft 20 and a secondary pulley 23 disposed on a secondary shaft 22. The primary pulley 21 may define a primary oil chamber 21a therein, and the secondary pulley 23 may define a secondary oil chamber 23a therein. A drive chain 24 may be wound around the primary pulley 21 and the secondary pulley 23. The drive chain 24 may transmit driving power between the primary pulley 21 and the secondary pulley 23. The continuously variable transmission 15 may control the hydraulic pressure in the primary oil chamber 21a and the secondary oil chamber 23a to vary the winding diameter of the drive chain 24. The continuously variable transmission 15 may thereby achieve stepless speed changing from the primary shaft 20 to the secondary shaft 22.

Example Configuration from Engine to
Continuously Variable Transmission

Now described is an example configuration on the engine 12 side relative to the continuously variable transmission 15, i.e., an example configuration from the engine 12 to the continuously variable transmission 15. The engine 12 may have a crank shaft 30 coupled to an input shaft 32 via a damper mechanism 31. The damper mechanism 31 coupling the crank shaft 30 and the input shaft 32 may include an input plate 33 fixed to the crank shaft 30, an output plate 34 fixed to the input shaft 32, and springs 35 assembled with the input plate 33 and the output plate 34. The damper mechanism 31 disposed between the crank shaft 30 and the input shaft 32 may cause the crank shaft 30 and the input shaft 32 to rotate relatively to each other at a predetermined rotational angle, reducing a torsional vibration to be transmitted from the crank shaft 30 to the input shaft 32. Note that the damper mechanism 31 illustrated in FIG. 2 may include no friction plate that transmits a torque between the input plate 33 and the output plate 34. That is, a torque may be transmitted between the input plate 33 and the output plate 34 only via the springs 35.

A forward/backward movement changeover mechanism 40 may be disposed between the input shaft 32 and the primary shaft 20. The forward/backward movement changeover mechanism 40 may switch the rotational direction of the primary shaft 20. The forward/backward movement changeover mechanism 40 may include a planetary gear train 41, a forward clutch 42, and a rear brake 43. The planetary gear train 41 may have a sun gear S coupled to the input shaft 32, and a carrier C coupled to the primary shaft 20. When a clutch controlling section 75 described below switches the forward clutch 42 of the forward/backward movement changeover mechanism 40 to an engaged state, the sun gear S and the carrier C of the planetary gear train 41 may rotate integrally with each other. That is, engaging the forward clutch 42 and releasing the rear brake 43 may cause the primary shaft 20 to rotate in the same rotational direction as the input shaft 32. In contrast, when the clutch controlling section 75 switches the rear brake 43 of the forward/backward movement changeover mechanism 40 to an engaged state, a ring gear R of the planetary gear train 41 may be fixed to a transmission case 44. That is, engaging the rear brake 43 and releasing the forward clutch 42 may cause the primary shaft 20 to rotate in a rotational direction opposite to the rotational direction of the input shaft 32. Note that the planetary gear train 41 illustrated in FIG. 2 may be a double-pinion planetary gear train including pinions P1 and P2. The paired pinions P1 and P2 may be rotatably supported by the carrier C, and the sun gear S and the ring gear R may be engaged with each other via the pinions P1 and P2. That is, the sun gear S may be engaged with the pinion P1, the pinion P1 may be engaged with the pinion P2, and the pinion P2 may be engaged with the ring gear R.

The first motor generator MG1 is disposed between the engine 12 and the continuously variable transmission 15. The first motor generator MG1 may mainly serve as an electric power generator. In one embodiment, the first motor generator MG1 may serve as an "electric-power generation motor". The first motor generator MG1 disposed between the damper mechanism 31 and the forward/backward movement changeover mechanism 40 includes a hollow rotor 45r through which the input shaft 32 extends, and a stator 45s disposed radially outward of the hollow rotor 45r. Further, a motor clutch 47 is disposed between the hollow rotor 45r and the input shaft 32. The motor clutch 47 is switched between an engaged state and a released state. The motor clutch 47 may be accommodated in an internal space of the hollow rotor 45r. When the motor clutch 47 is switched to the engaged state by the clutch controlling section 75, the input shaft 32 and the hollow rotor 45r may be coupled to each other. In contrast, when the motor clutch 47 is switched to the released state by the clutch controlling section 75, the coupling between the input shaft 32 and the hollow rotor 45r may be released. The first motor generator MG1 disposed at a so-called position P2 may be an electric-power generation motor mainly serving as an electric-power generator; however, the first motor generator MG1 may also serve as an electric motor at the time of activation of the engine described below. Such a first motor generator MG1 serving as a starter motor may be also referred to as an integrated starter generator (ISG).

Example Configuration from Continuously Variable Transmission to Wheels

Now described is an example configuration on the wheels 17, 18 side relative to the continuously variable transmission 15, i.e., an example configuration from the continuously variable transmission 15 to the wheels 17 and 18. The secondary shaft 22 of the continuously variable transmission 15 may be coupled to a transmission gear train 50. The transmission gear train 50 may be coupled to a motor drive system 52 via an output clutch 51. In one embodiment, the output clutch 51 may serve as a "mode switching clutch". When the output clutch 51 is switched to an engaged state by the clutch controlling section 75, the continuously variable transmission 15 may be coupled to a front-wheel output shaft 53 of the motor drive system 52. In contrast, when the output clutch 51 is switched to a released state by the clutch controlling section 75, the continuously variable transmission 15 may be separated from the front-wheel output shaft 53 of the motor drive system 52. That is, engaging the output clutch 51 may couple the engine 12 to the motor drive system 52 via the continuously variable transmission 15. In contrast, releasing the output clutch 51 may separate the continuously variable transmission 15 and the engine 12 from the motor drive system 52. In one embodiment, the front-wheel output shaft 53 may serve as an "output shaft".

The motor drive system 52 may include the second motor generator MG2. The second motor generator MG2 may serve as an electric motor and an electric-power generator. In one embodiment, the second motor generator MG2 may serve as a "traveling motor". The second motor generator MG2 disposed at a so-called position P3 may include a rotor 54r and a stator 54s disposed radially outward of the rotor 54r. The rotor 54r of the second motor generator MG2 may be coupled to a motor output shaft 56 via a deceleration gear train 55. The motor output shaft 56 may be coupled to the front-wheel output shaft 53 via a transmission gear train 57, and may be coupled to a rear-wheel output shaft 59 via the transfer clutch 58. The front-wheel output shaft 53 may be coupled to the front wheel 17 via the differential mechanism 16. The rear-wheel output shaft 59 may be coupled to the rear wheel 18 via devices including a non-illustrated differential mechanism 16. When the clutch controlling section 75 switches the transfer clutch 58 to an engaged state, the rear wheel 18 may be coupled to the second motor generator MG2. The second motor generator MG2 may then drive both of the front wheel 17 and the rear wheel 18. In contrast, when the clutch controlling section 75 switches the transfer clutch 58 to a released state, the rear wheel 18 may be separated from the second motor generator MG2. The second motor generator MG2 may then drive only the front wheel 17.

Traveling Mode

Figure 3A:
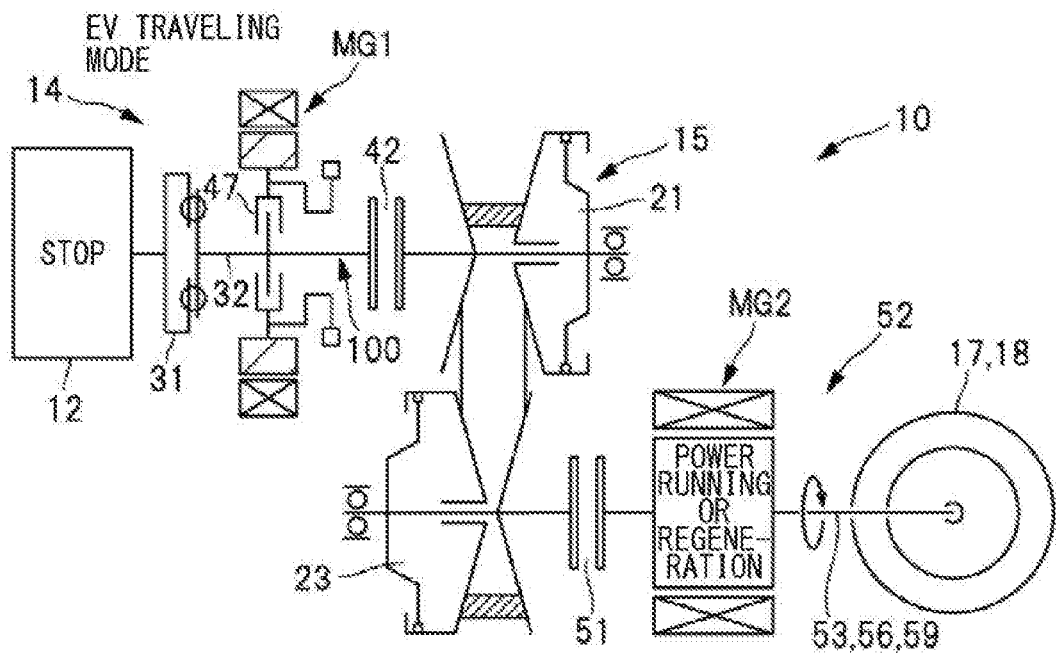
FIG. 3A is a schematic diagram illustrating an example operating state of the power train in an EV mode.
Figure 3B:
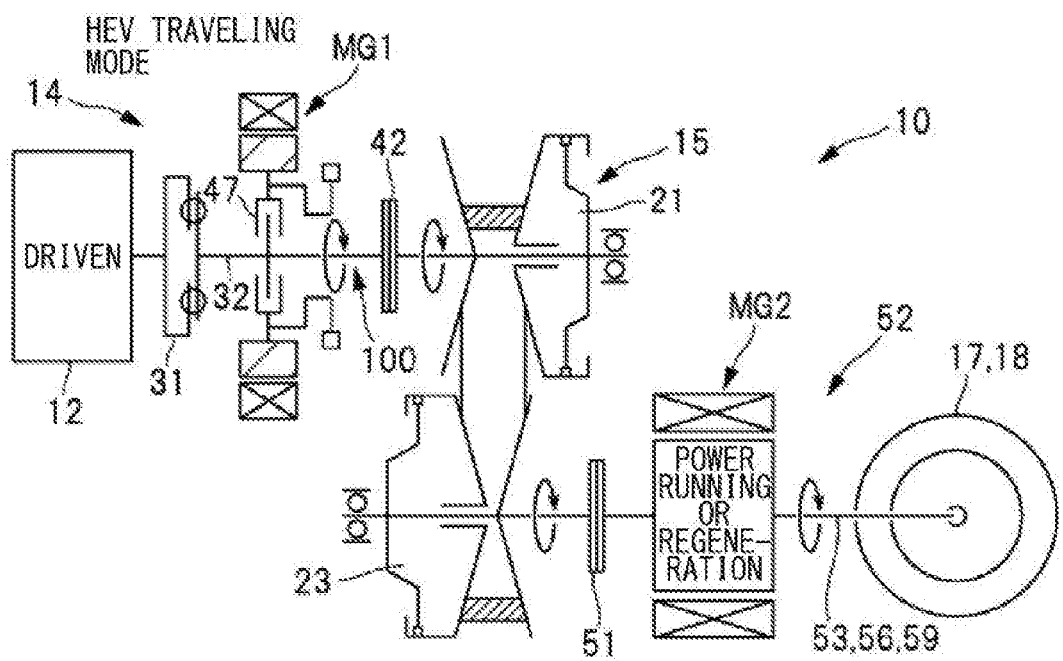
FIG. 3B is a schematic diagram illustrating an example operating state of the power train in an HEV mode.

FIG. 3A schematically illustrates an example operating state of the power train 14 in an electric vehicle (EV) mode. FIG. 3B schematically illustrates an example operating state of the power train 14 in a hybrid electric vehicle (HEV) mode. Note that the transfer clutch 58, the rear brake 43, and other components are omitted in the illustration of the power train 14 in FIGS. 3A and 3B. FIG. 3B illustrates the operating state of the power train 14 when the forward traveling range (D range) is selected.

The vehicle 11 according to the example embodiment may be operable in two traveling modes including the EV mode and the HEV mode. In one embodiment, the EV mode may serve as a "motor traveling mode". In one embodiment, the HEV mode may serve as an "engine traveling mode". While the vehicle 11 is traveling in the EV mode, the engine 12 may be separated from the motor drive system 52; therefore, the vehicle 11 may travel using the second motor generator MG2 in the EV mode. While the vehicle 11 is traveling in the HEV mode, the engine 12 may be coupled to the motor drive system 52; therefore the vehicle 11 may travel using the engine 12 and the second motor generator MG2 in the HEV mode. For example, the EV mode may be selected in a case where a required driving power or a vehicle speed is low. In contrast, the HEV mode may be selected in a case where the required driving power or the vehicle speed is high.

In the EV mode illustrated in FIG. 3A, both of the forward clutch 42 and the output clutch 51 may be switched to the released state by the clutch controlling section 75. This may separate the continuously variable transmission 15 and the engine 12 from the motor drive system 52. The wheels 17 and 18 may thus be driven by the motor drive system 52 while the continuously variable transmission 15 and the engine 12 are stopped. In other words, the vehicle 11 may travel using only the motor power in the EV mode.

In contrast, in the HEV mode illustrated in FIG. 3B, both of the forward clutch 42 and the output clutch 51 may be switched to the engaged state by the clutch controlling section 75. This may couple the engine 12 to the motor drive system 52 via the continuously variable transmission 15. The wheels 17 and 18 may thus be driven by the motor drive system 52 to which the engine power is transmitted. In other words, the vehicle 11 may travel using both of the engine power and the motor power in the HEV mode. Note that the vehicle 11 may be caused to travel using only the engine power in the engine traveling mode or the HEV mode, by causing the second motor generator MG2 of the motor drive system 52 to run idle.

Hydraulic System

A hydraulic system 60 that supplies hydraulic fluid to the transmission 13 will now be described. The power train 14 may include the hydraulic system 60 that supplies hydraulic fluid to the continuously variable transmission 15, the motor clutch 47, the forward clutch 42, the rear brake 43, the output clutch 51, the transfer clutch 58, and other components. The hydraulic system 60 may include a first oil pump 61 and a second oil pump 62. The first oil pump 61 may be coupled to the hollow rotor 45r of the first motor generator MG1 via a chain mechanism 63. In one embodiment, the first oil pump 61 may serve as an "oil pump". The second oil pump 62 may be coupled to an electric motor 64. The hydraulic system 60 may further include a valve body 65 coupled to both of the first oil pump 61 and the second oil pump 62. The valve body 65 may include non-illustrated electromagnetic valves and oil passages. The valve body 65 may control the destination and pressure of the hydraulic fluid supply.

At very low temperature at which the viscosity of the hydraulic fluid increases, a large load can be exerted on the pump that discharges the hydraulic fluid. In such a case, the first oil pump 61 may be driven by the first motor generator MG1 larger in capacity than the electric motor 64, and the hydraulic fluid discharged from the first oil pump 61 may be supplied to the valve body 65. In contrast, at normal temperature at which the viscosity of the hydraulic fluid decreases, a small load can be exerted on the pump that discharges the hydraulic fluid. In such a case, the second oil pump 62 may be driven by the electric motor 64 smaller in capacity than the first motor generator MG1, and the hydraulic fluid discharged from the second oil pump 62 may be supplied to the valve body 65.

Control System

Figure 4:
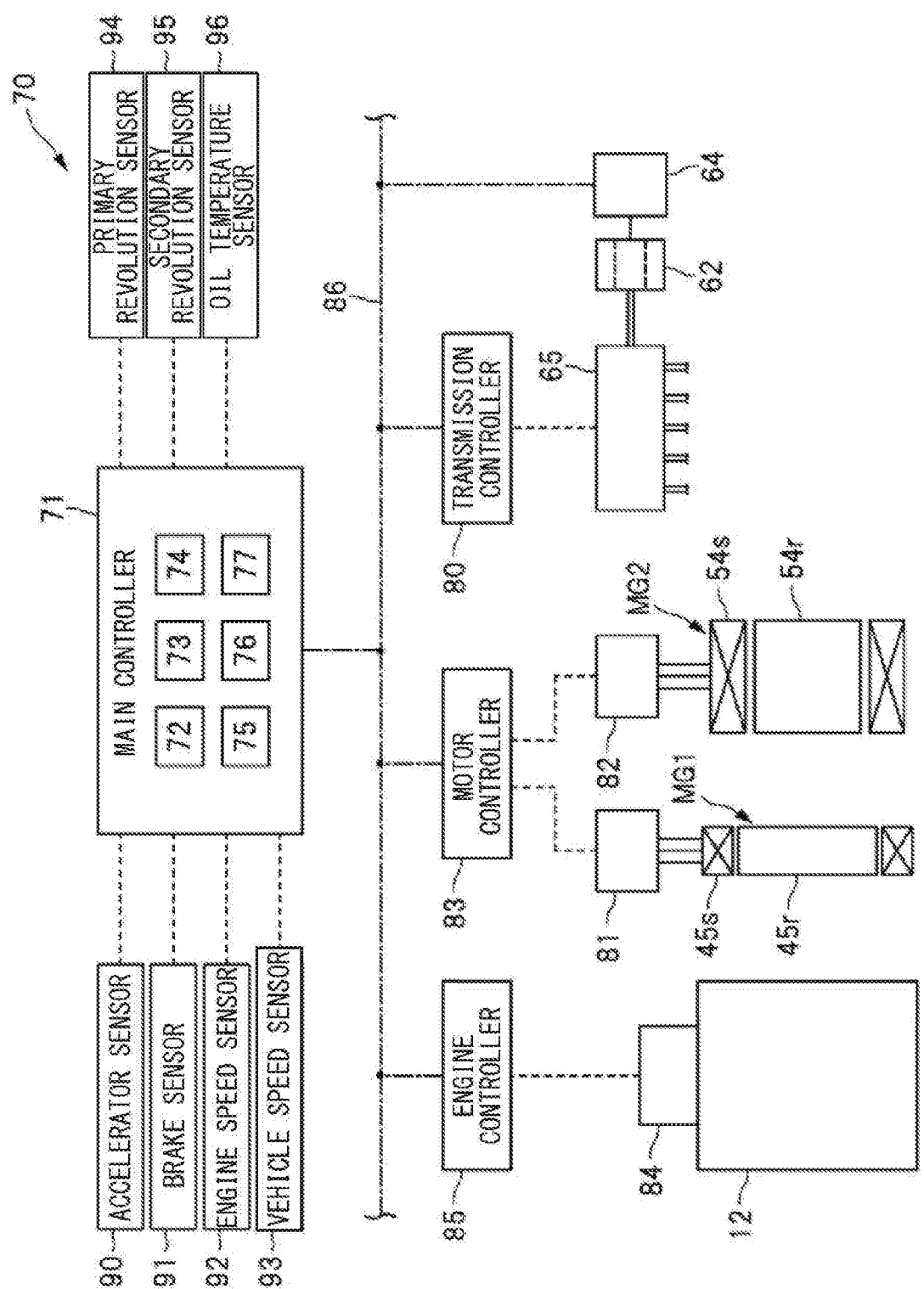
FIG. 4 is a diagram illustrating a part of a control system for the power train.

FIG. 4 illustrates a part of the control system 70 for the power train 14. With reference to FIG. 4, the control system 70 for the power train 14 may include a main controller 71. For example, the main controller 71 may be a microcomputer. The main controller 71 may include a mode selecting section 72, an engine controlling section 73, a motor controlling section 74, and the clutch controlling section 75. The mode selecting section 72 may select a traveling mode on the basis of a driving status or other conditions. The engine controlling section 73 may control the engine 12. The motor controlling section 74 may control the first motor generator MG1 and the second motor generator MG2. The clutch controlling section 75 may control various clutches including the forward clutch 42, the rear brake 43, the motor clutch 47, the output clutch 51, and the transfer clutch 58. In one embodiment, the clutch controlling section 75 may serve as a "clutch controller" and a "second clutch controller". The main controller 71 may further include a transmission controlling section 76 and a pump controlling section 77. The transmission controlling section 76 may control the continuously variable transmission 15. The pump controlling section 77 may control the electric motor 64 of the second oil pump 62.

The control system 70 for the power train 14 may further include a transmission controller 80. For example, the transmission controller 80 may be a microcomputer. The transmission controller 80 may control the continuously variable transmission 15 and various clutches including the forward clutch 42, the rear brake 43, the motor clutch 47, the output clutch 51, and the transfer clutch 58 via the valve body 65. The control system 70 for the power train 14 may further include a motor controller 83. For example, the motor controller 83 may be a microcomputer. The motor controller 83 may control the first motor generator MG1 and the second motor generator MG2 via respective inverters 81 and 82. The control system 70 for the power train 14 may further include an engine controller 85. For example, the engine controller 85 may be a microcomputer. The engine controller 85 may control an engine auxiliary device 84, such as a throttle valve or an injector. Note that the first motor generator MG1 and the second motor generator MG2 may be coupled to a non-illustrated battery via the respective inverters 81 and 82.

The main controller 71 and various controllers including the transmission controller 80, the motor controller 83, and the engine controller 85 may be coupled to each other via a communication network 86 to establish communication therebetween. The communication network 86 may be a CAN, for example. The mode selecting section 72, the engine controlling section section 73, the motor controlling section 74, the clutch controlling section 75, the transmission controlling section 76, and the pump controlling section 77 of the main controller 71 may set target operating states of the first motor generator MG1, the second motor generator MG2, the engine 12, and various clutches including the forward clutch 42, the rear brake 43, the motor clutch 47, the output clutch 51, and the transfer clutch 58 on the basis of data from various sensors. Thereafter, the main controller 71 may output control signals to the transmission controller 80, the motor controller 83, and the engine controller 85 to bring the first motor generator MG1, the second motor generator MG2, the engine 12, and various clutches including forward clutch 42, the rear brake 43, the motor clutch 47, the output clutch 51, and the transfer clutch 58 into the respective target operating states.

Examples of the sensors coupled to the main controller 71 may include an accelerator sensor 90, a brake sensor 91, an engine speed sensor 92, and a vehicle speed sensor 93. The accelerator sensor 90 may detect the operating state of the accelerator pedal. The brake sensor 91 may detect the operating state of the brake pedal. The engine speed sensor 92 may detect the number of revolutions of the engine 12. The number of revolutions of the engine 12 may correspond to the rotational speed of the crank shaft 30. In one embodiment, the number of revolutions of the engine 12 may serve as "engine revolution number". The vehicle speed sensor 93 may detect the vehicle speed. Another examples of the sensors coupled to the main controller 71 may include a primary rotation sensor 94, a secondary rotation sensor 95, and an oil temperature sensor 96. The primary rotation sensor 94 may detect the rotational speed of the primary shaft 20. The secondary rotation sensor 95 may detect the rotational speed of the secondary shaft 22. The oil temperature sensor 96 may detect the temperature of the hydraulic fluid flowing in the hydraulic system 60.

EV Mode: Toil>T1

Figure 5A:
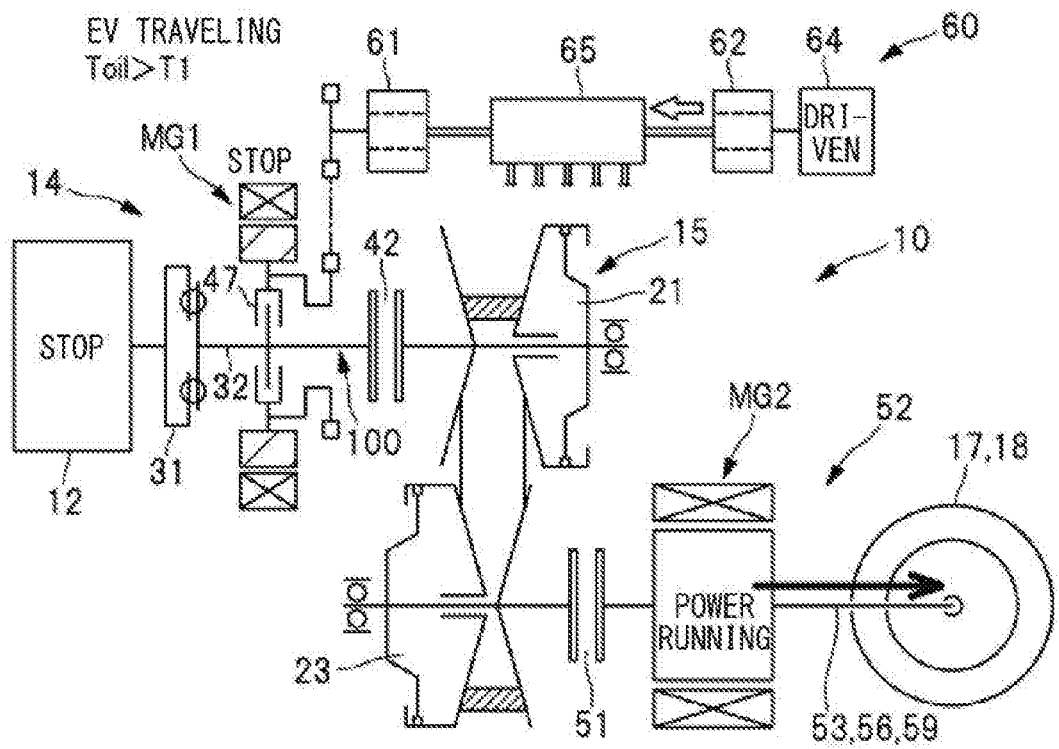
FIG. 5A is a schematic diagram illustrating an example operating state of the power train in the EV mode.
Figure 5B:
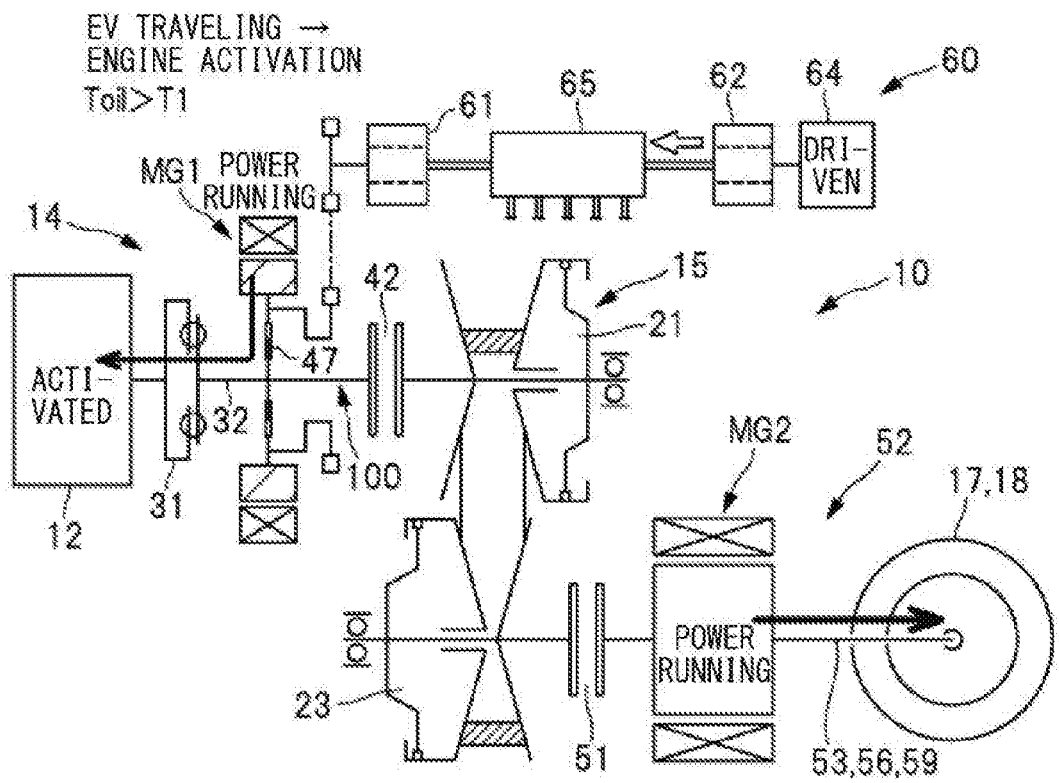
FIG. 5B is a schematic diagram illustrating an example operating state of the power train in the case of engine activation in the EV mode.

FIG. 5A illustrates an example operating state of the power train 14 in the EV mode, and FIG. 5B illustrates an example operating state of the power train 14 in the case of engine activation in the EV mode. In the situations illustrated in FIGS. 5A and 5B, the hydraulic fluid has a temperature Toil higher than a predetermined temperature T1, and the vehicle 11 is accelerating or traveling at a constant speed. Thick arrows in FIGS. 5A and 5B each indicate the flow of the motor torque.

In the EV mode illustrated in FIG. 5A, the forward clutch 42 and the output clutch 51 may both be switched to the released state, and the engine 12 may be switched to a stopping state. While the vehicle 11 is accelerating or traveling at a constant speed, the second motor generator MG2 may be switched to a power running state. Accordingly, in the EV mode, the wheels 17 and 18 may be driven by the second motor generator MG2 while the engine 12 and the continuously variable transmission 15 are stopped.

In a case where the temperature Toil of the hydraulic fluid is higher than the predetermined temperature T1 in the EV mode, the hydraulic fluid has a low viscosity, and a small load can thus be exerted on the pump. In such a case, the second oil pump 62 may be driven by the electric motor 64 smaller in capacity than the first motor generator MG1, causing the hydraulic fluid to be supplied from the second oil pump 62 to the valve body 65, as indicated by a hollow arrow in FIG. 5A. Note that the motor clutch 47 may be switched to the released state, and the first motor generator MG1 may be switched to the stopping state.

For example, in a case where the accelerator pedal is pressed down to increase the required driving power in the situation illustrated in FIG. 5A, switching from the EV mode to the HEV mode may be determined. Upon the determination of the switching to the HEV mode, the motor clutch 47 may be switched to the engaged state, and the first motor generator MG1 may be switched to the power running state, as illustrated in FIG. 5B. The first motor generator MG1 may thus rotate the crank shaft 30 while the vehicle 11 is traveling in the EV mode. The engine 12 may be thereby activated in preparation for the switching to the HEV mode.

Note that no driving power may be transmitted from the first motor generator MG1 to the wheels 17 and 18 in the EV mode, as illustrated in FIG. 5A. This makes it possible to avoid deceleration of the vehicle 11 due to a shortage of motor torque at the time of a cranking operation to cause the first motor generator MG1 to activate the engine 12. Accordingly, it is possible to activate the engine without making the driver feel strange.

EV Mode: Toil≤T1

Figure 6A:
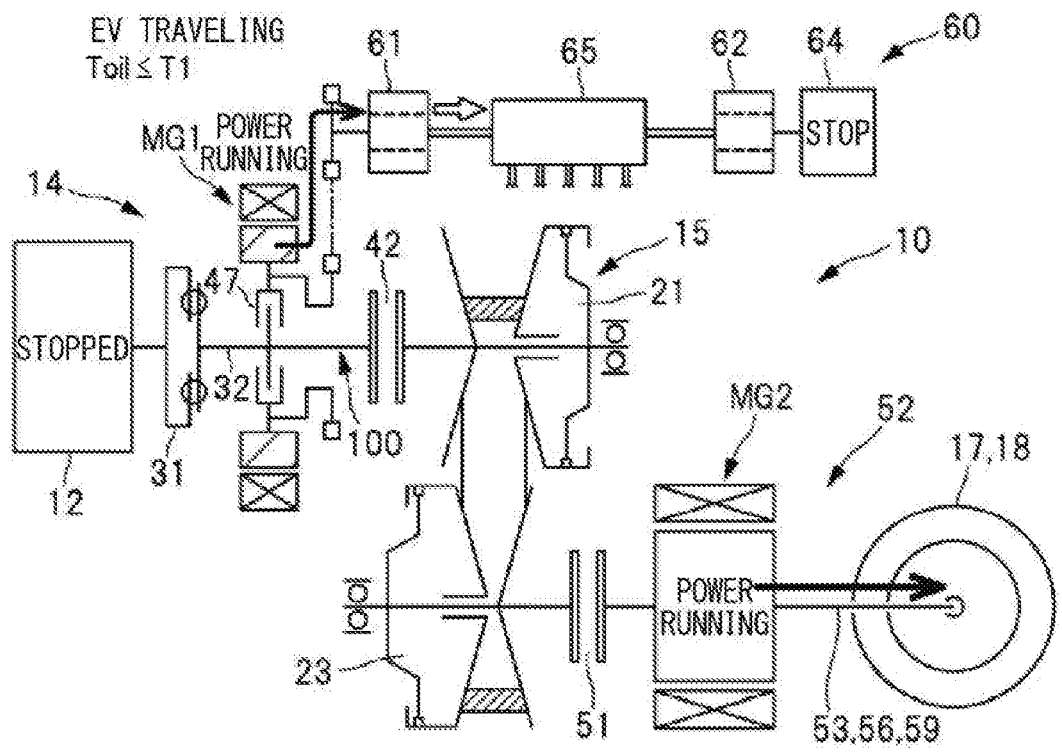
FIG. 6A is a schematic diagram illustrating an example operating state of the power train in the EV mode.
Figure 6B:
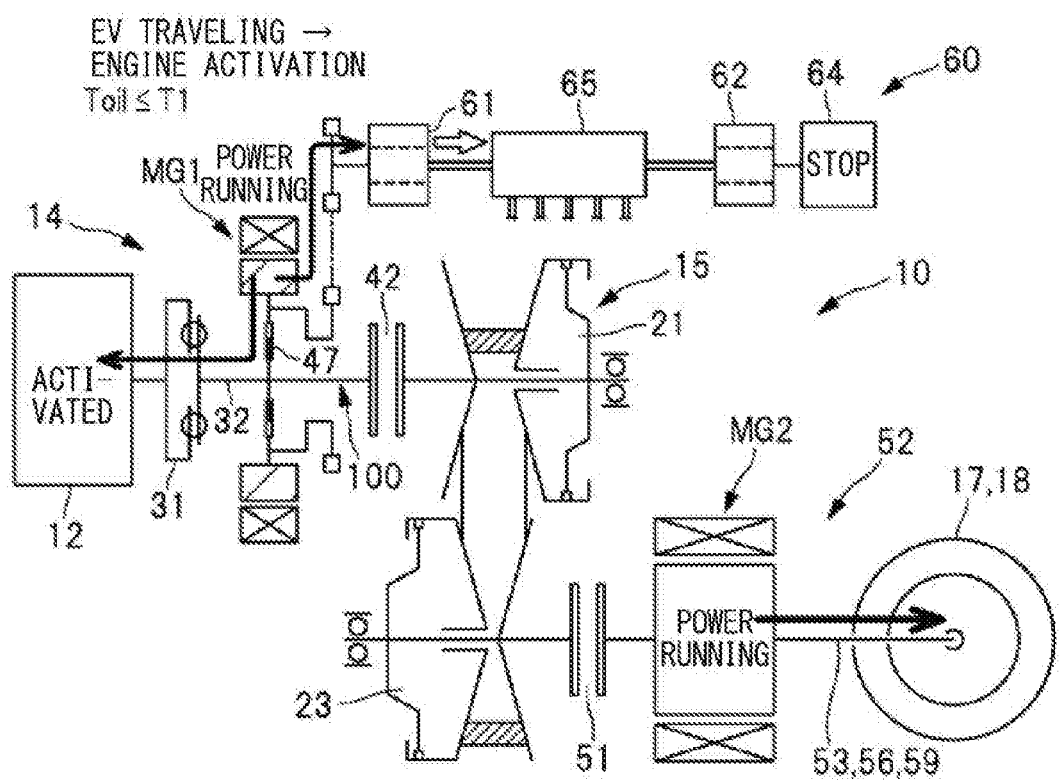
FIG. 6B is a schematic diagram illustrating an example operating state of the power train in the case of engine activation in the EV mode.

FIG. 6A illustrates an example operating state of the power train 14 in the EV mode, and FIG. 6B illustrates an example operating state of the power train 14 in the case of engine activation in the EV mode. In the situations illustrated in FIGS. 6A and 6B, the hydraulic fluid has a temperature Toil equal to or lower than the predetermined temperature T1, and the vehicle 11 is accelerating or traveling at a constant speed. Thick arrows in FIGS. 6A and 6B each indicate the flow of the motor torque.

In the EV mode illustrated in FIG. 6A, the forward clutch 42 and the output clutch 51 may both be switched into the released state, and the engine 12 may be switched to the stopping state. While the vehicle 11 is accelerating or traveling at a constant speed, the second motor generator MG2 may be switched to the power running state. Accordingly, in the EV mode, the wheels 17 and 18 may be driven by the second motor generator MG2 while the engine 12 and the continuously variable transmission 15 are stopped.

In a case where the temperature Toil of the hydraulic fluid is equal to or lower than the predetermined temperature T1 in the EV mode, the hydraulic fluid has a high viscosity, and a large load can thus be exerted on the pump. In such a case, the first oil pump 61 may be driven by the first motor generator MG1 larger in capacity than electric motor 64, causing the hydraulic fluid to be supplied from the first oil pump 61 to the valve body 65, as illustrated by a hollow arrow in FIG. 6A. Note that the motor clutch 47 may be switched to the released state.

For example, in a case where the accelerator pedal is pressed down to increase the required driving power in the situation illustrated in FIG. 6A, switching from the EV mode to the HEV mode may be determined. Upon the determination of the switching to the HEV mode, the motor clutch 47 serving as a friction clutch may be switched from the released state to the engaged state via a slip state while the first motor generator MG1 is maintained in the power running state, as illustrated in FIG. 6B. The first motor generator MG1 may thus rotate the crank shaft 30 while the vehicle 11 is traveling in the EV mode. The engine 12 may be thereby activated in preparation for the switching to the HEV mode.

Note that no driving power may be transmitted from the first motor generator MG1 to the wheels 17 and 18 in the EV mode, as illustrated in FIG. 6A. This makes it possible to avoid deceleration of the vehicle 11 due to a shortage of motor torque at the time of a cranking operation to cause the first motor generator MG1 to activate the engine 12. Accordingly, it is possible to activate the engine without making the driver feel strange.

HEV Mode: Low Required Driving Power, Toil>T1

Figure 7A:
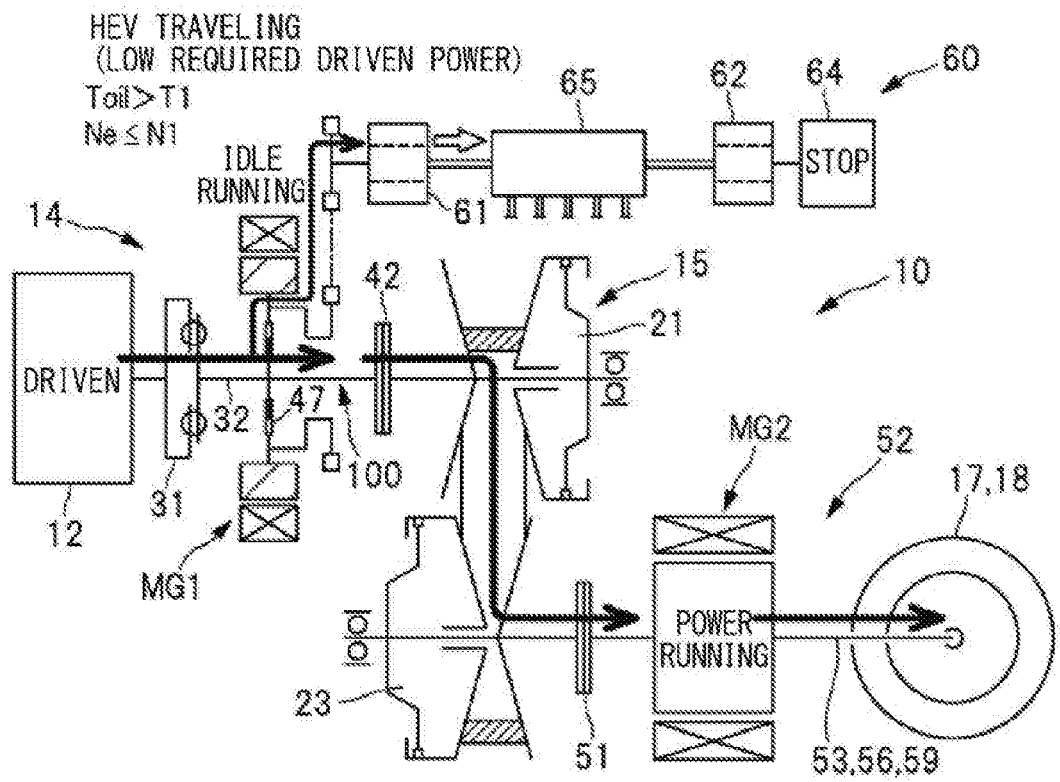
FIG. 7A is a schematic diagram illustrating an example operating state of the power train in the HEV mode.
Figure 7B:
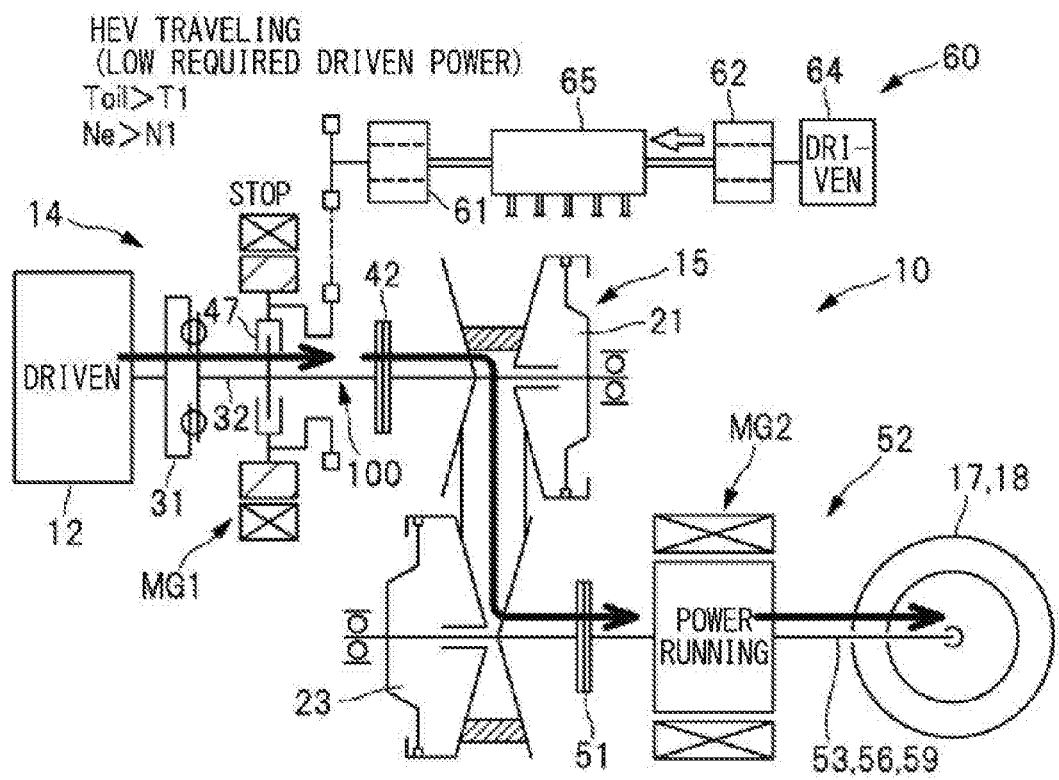
FIG. 7B is a schematic diagram illustrating an example operating state of the power train in the HEV mode.

FIGS. 7A and 7B illustrate example operating states of the power train 14 in the HEV mode. FIG. 7A illustrates an example situation where the engine revolution number Ne is equal to or less than predetermined revolution number N1, and FIG. 7B illustrates an example situation where the engine revolution number Ne is greater than the predetermined revolution number N1. In the situations illustrated in FIGS. 7A and 7B, the required driving power for the power train 14 is low, the temperature Toil of the hydraulic fluid is higher than the predetermined temperature T1, and the vehicle 11 is accelerating or traveling at a constant speed. Thick arrows in FIGS. 7A and 7B each indicate the flow of the motor torque. In one embodiment, the predetermined revolution number N1 may serve as a "first revolution number".

In the HEV mode illustrated in FIG. 7A, the forward clutch 42 and the output clutch 51 may both be switched to the engaged state, and the engine 12 may be switched to a driven state. While the vehicle 11 is accelerating or traveling at a constant speed, the second motor generator MG2 may be switched to the power running state. Accordingly, in the HEV mode, the wheels 17 and 18 may be driven by the engine power outputted from the engine 12 and the motor power outputted from the second motor generator MG2.

Further, in the HEV mode in which the engine 12 is in the driven state, the motor clutch 47 may be switched to the engaged state to couple the engine 12 and the first oil pump 61. The first oil pump 61 may then be driven by the engine 12, causing the hydraulic fluid to be suppled from the first oil pump 61 to the valve body 65, as indicated by a hollow arrow in FIG. 7A. Note that the first motor generator MG1 may be switched to an idle running state.

In a case where the engine revolution number Ne increases to a value greater than the predetermined revolution number N1 in the situation illustrated in FIG. 7A, the motor clutch 47 may be switched to the released state to prevent the torsional resonance from occurring, as illustrated in FIG. 7B. In association with the release of the motor clutch 47, the transmission of the engine power to the first oil pump 61 may be interrupted, which stops driving the first oil pump 61 with the engine power. In this case, the hydraulic fluid has the temperature Toil higher than the predetermined temperature T1 and thus has a low viscosity; therefore, the second oil pump 62 may be driven by the electric motor 64 smaller in capacity than the first motor generator MG1, causing the hydraulic fluid to be supplied from the second oil pump 62 to the valve body 65.

As described above, in a case where the engine revolution number Ne increases to a value greater than the predetermined revolution number N1, the motor clutch 47 may be switched to the released state. This separates the first motor generator MG1 from the input shaft 32 to prevent torsional resonance of a power transmission passage 100 including the input shaft 32 and the first motor generator MG1 from occurring. In other words, separating the first motor generator MG1 from the input shaft 32 reduces the inertia of the power transmission passage 100 and increases the natural frequency of the power transmission passage 100. Accordingly, it is possible to prevent the torsional resonance of the power transmission passage 100 from occurring.

Figure 8:
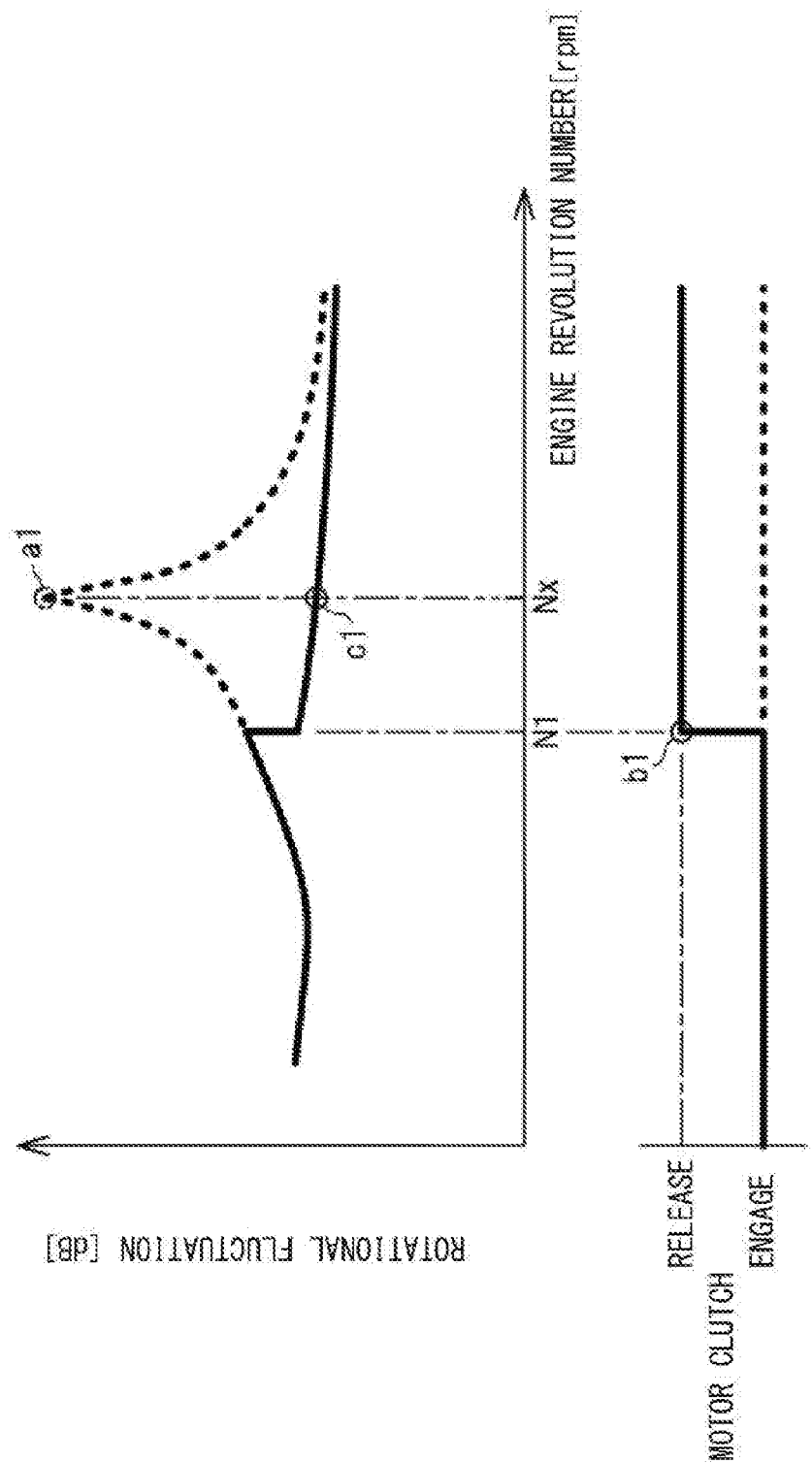
FIG. 8 illustrates rotational fluctuations generated in a vehicle including the power train.

FIG. 8 illustrates rotational fluctuations generated in the vehicle 11 including the power train 14. If the motor clutch 47 is held in the engaged state in a region indicated by a broken line in FIG. 8 in which the engine revolution number Ne is greater than the predetermined revolution number N1, the power transmission passage 100 can generate torsional resonance at the resonance revolution number Nx greater than the predetermined revolution number N1, as indicated by a reference character a1. The torsional resonance can generate noises such as gear rattle noises or booming noises.

To address such a concern, the vehicle driving apparatus 10 according to the example embodiment may switch the motor clutch 47 to the released state, as indicated by a reference character b1 in FIG. 8, when the engine revolution number Ne becomes greater than the predetermined revolution number N1. Releasing the motor clutch 47 may separate the second motor generator MG2 from the power transmission passage 100, which reduces the inertia of the power transmission passage 100 and increases the natural frequency of the power transmission passage 100. Accordingly, it is possible to prevent the torsional resonance of the power transmission passage 100 from occurring, as indicated by a reference character c1 in FIG. 8, and thus to prevent noises such as gear rattle noises or booming noises from being generated due to the torsional resonance of the power transmission passage 100.

Further, as illustrated in FIG. 2, the power train 14 may include the first motor generator MG1 provided between the damper mechanism 31 and the forward/backward movement changeover mechanism 40, and the input shaft 32 may extend through the first motor generator MG1. This structure can require a longer input shaft 32 extending through the first motor generator MG1; it thus has been difficult to strengthen the stiffness of the input shaft 32 and increase the natural frequency in order to prevent the torsional resonance of the power transmission passage 100 from occurring. To address such a concern, the vehicle driving apparatus 10 according to the example embodiment may release the motor clutch 47 on the basis of the engine revolution number Ne. This makes it possible to reduce the inertia of the power transmission passage 100 and increase the natural frequency of the power transmission passage 100 in the revolution range in which the power transmission passage 100 can generate the torsional resonance. Accordingly, it is possible to prevent the torsional resonance of the power transmission passage 100 from occurring.

Further, preventing the torsional resonance of the power transmission passage 100 by releasing the motor clutch 47 also leads to a reduction in the number of damper mechanisms to be disposed between the engine 12 and the forward/backward movement changeover mechanism 40. That is, there is no need to provide any damper mechanism in addition to the damper mechanism 31 between the first motor generator MG1 and the forward/backward movement changeover mechanism 40. This makes it possible to reduce the size and cost of the power train 14. Moreover, there is no need to ensure a space for additional damper mechanisms. This allows the differential mechanism 16 and the front wheel 17 to be disposed closer to each other, increasing the efficiency in power transmission from the differential mechanism 16 to the front wheel 17.

Further, there is no need to provide a friction plate that suppresses torsional resonance in the damper mechanism 31 coupling the crank shaft 30 and the input shaft 32. This makes it possible to reduce the size and cost of the damper mechanism 31, and further reduces booming noises. Moreover, the vehicle driving apparatus 10 according to the example embodiment may switch the motor clutch 47 to the engaged state in a case where the engine revolution number Ne is equal to or less than the predetermined revolution number N1. Engaging the motor clutch 47 increases the inertia of the power transmission passage 100, and further reduces booming noises to be generated in a low revolution range of the engine 12.

HEV Mode: Low Required Driving Power, Toil≤T1

Figure 9A:
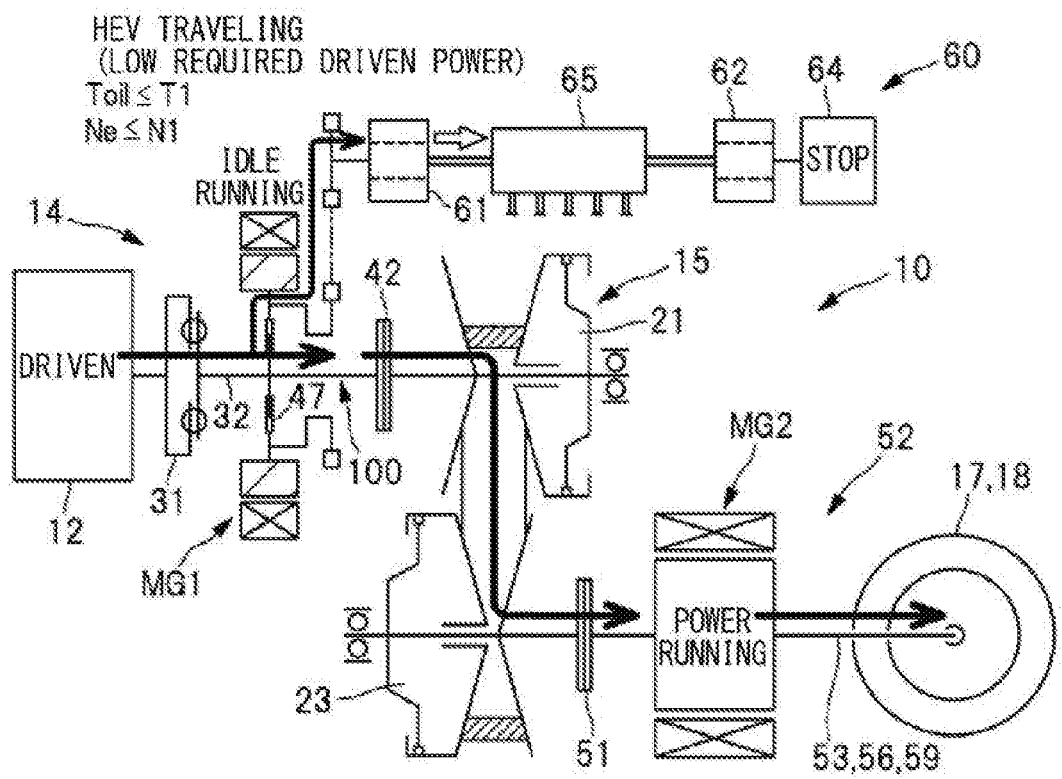
FIG. 9A is a schematic diagram illustrating an example operating state of the power train in the HEV mode.
Figure 9B:
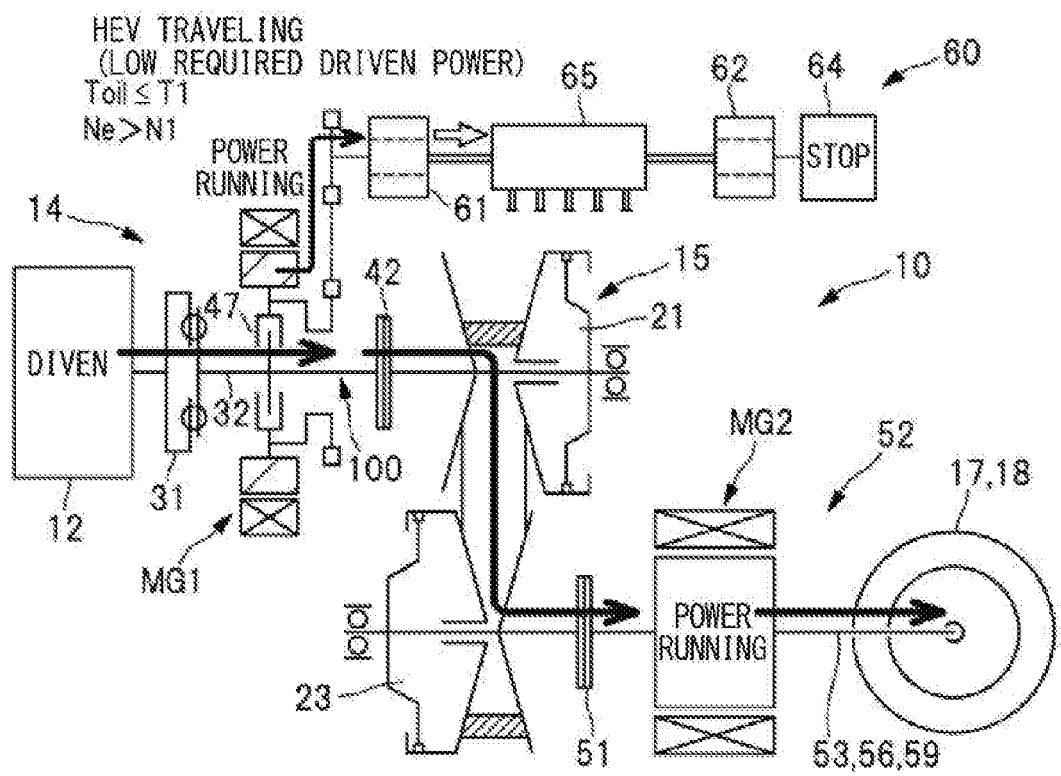
FIG. 9B is a schematic diagram illustrating an example operating state of the power train in the HEV mode.

FIGS. 9A and 9B illustrate example operating states of the power train 14 in the HEV mode. FIG. 9A illustrates an example situation where the engine revolution number Ne is equal to or less than predetermined revolution number N1, and FIG. 9B illustrates an example situation where the engine revolution number Ne is greater than the predetermined revolution number N1. In the situations illustrated in FIGS. 9A and 9B, the required driving power for the power train 14 is low, the temperature Toil of the hydraulic fluid is equal to or lower than the predetermined temperature T1, and the vehicle 11 is accelerating or traveling at a constant speed. Thick arrows in FIGS. 9A and 9B each indicate the flow of the engine torque and the motor torque.

In the HEV mode illustrated in FIG. 9A, the forward clutch 42 and the output clutch 51 may both be switched to the engaged state, and the engine 12 may be switched to the driven state. While the vehicle 11 is accelerating or traveling at a constant speed, the second motor generator MG2 may be switched to the power running state. Accordingly, in the HEV mode in which the required driving power is low, the wheels 17 and 18 may be driven by the engine 12 and the second motor generator MG2.

Further, in the HEV mode in which the engine 12 is in the driven state, the motor clutch 47 may be switched to the engaged state to couple the engine 12 and the first oil pump 61. The first oil pump 61 may then be driven by the engine 12, causing the hydraulic fluid to be supplied from the first oil pump 61 to the valve body 65 as illustrated by a hollow arrow in FIG. 9A. Note that the first motor generator MG1 may be switched to the idle running state.

In a case where the engine revolution number Ne increases to a value greater than the predetermined revolution number N1 in the situation illustrated in FIG. 9A, the motor clutch 47 may be switched to the released state to prevent torsional resonance from occurring, as illustrated in FIG. 9B. In association with the release of the motor clutch 47, the transmission of the engine power to the first oil pump 61 may be interrupted, which stops driving the first oil pump 61 with the engine power. In this case, the hydraulic fluid has a temperature Toil equal to or lower than the predetermined temperature T1 and thus has a high viscosity; therefore, the first oil pump 61 may be driven by the first motor generator MG1 larger in capacity than the electric motor 64, causing the hydraulic fluid to be supplied from the first oil pump 61 to the valve body 65.

As described above, in a case where the engine revolution number Ne increases to a value greater than the predetermined revolution number N1, the motor clutch 47 may be switched to the released state. This separates the first motor generator MG1 from the input shaft 32 to prevent torsional resonance of the power transmission passage 100 including the input shaft 32 and the first motor generator MG1 from occurring. In other words, as described above with reference to FIGS. 7B and 8, separating the first motor generator MG1 from the input shaft 32 reduces the inertia of the power transmission passage 100 and increases the natural frequency of the power transmission passage 100. Accordingly, it is possible to prevent the torsional resonance of the power transmission passage 100 from occurring.

HEV Mode: High Required Driving Power, Low Gear

Figure 10A:
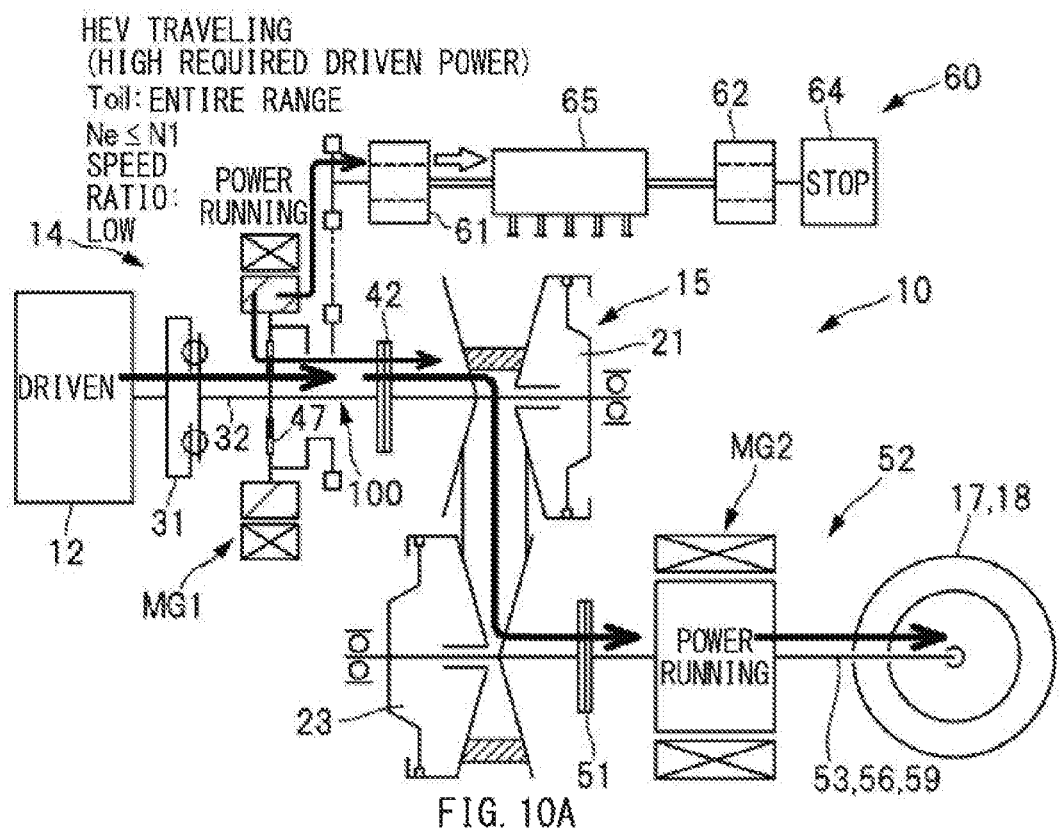
FIG. 10A is a schematic diagram illustrating an example operating state of the power train in the HEV mode.
Figure 10B:
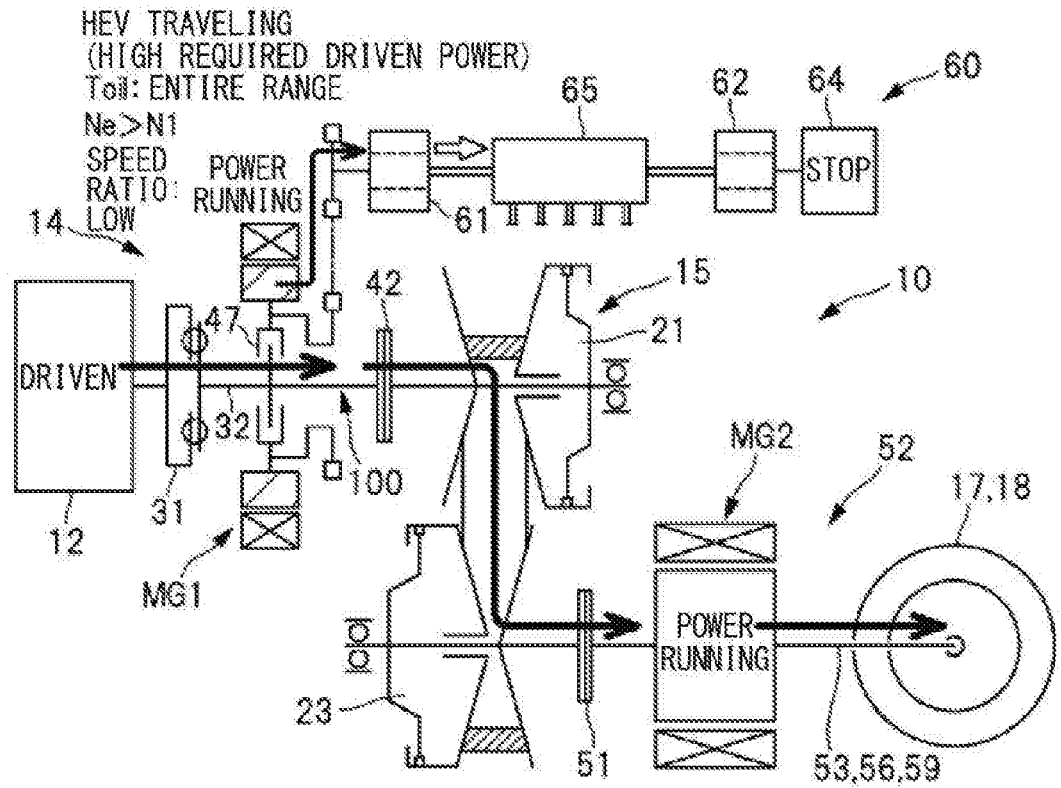
FIG. 10B is a schematic diagram illustrating an example operating state of the power train in the HEV mode.

FIGS. 10A and 10B illustrate example operating states of the power train 14 in the HEV mode. FIG. 10A illustrates an example situation where the engine revolution number Ne is equal to or less than the predetermined revolution number N1, and FIG. 10B illustrates an example situation where the engine revolution number Ne is greater than the predetermined revolution number N1. In the situations illustrated in FIGS. 10A and 10B, the required driving power for the power train 14 is high, the speed ratio of the continuously variable transmission 15 is set on the low side, and the vehicle 11 is accelerating. Thick arrows in FIGS. 10A and 10B each indicate the flow of the engine torque and the motor torque.

In the HEV mode illustrated in FIG. 10A, the forward clutch 42 and the output clutch 51 may both be switched to the engaged state. As described above, the required driving power for the power train 14 is high, and the speed ratio of the continuously variable transmission 15 is set on the low side; therefore, the engine 12 may be switched to the driven state, and the second motor generator MG2 may be switched to the power running state. Additionally, the motor clutch 47 may be switched to the engaged state, and the first motor generator MG1 may be switched to the power running state. Accordingly, in the HEV mode in which the required driving power is high, the wheels 17 and 18 may be driven by the engine 12 and the first motor generator MG1 and the second motor generator MG2.

That is, the output torque of the first motor generator MG1 smaller than the output torque of the second motor generator MG2 may be converted into a larger torque by setting the speed ratio of the continuously variable transmission 15 on the low side. This enhances the traveling performance of the vehicle 11 using the first motor generator MG1. Note that, in the situation illustrated in FIG. 10A, the first oil pump 61 may be driven by the first motor generator MG1, causing the hydraulic fluid to be supplied from the first oil pump 61 to the valve body 65 as illustrated by a hollow arrow in FIG. 10A.

In a case where the engine revolution number Ne increases to a value greater than the predetermined revolution number N1 in the situation illustrated in FIG. 10A, the motor clutch 47 may be switched to the released state to prevent torsional resonance from occurring, as illustrated in FIG. 10B. In the situation illustrated in FIG. 10B, the required driving power is high, and thus an increased amount of the hydraulic fluid is consumed by the continuously variable transmission 15 and other components. Accordingly, the first oil pump 61 may be driven by the first motor generator MG1 larger in capacity than the electric motor 64 to keep supplying the hydraulic fluid from the first oil pump 61 to the valve body 65.

As described above, in a case where the engine revolution number Ne increases to a value greater than the predetermined revolution number N1, the motor clutch 47 may be switched to the released state. This separates the first motor generator MG1 from the input shaft 32 to prevent the torsional resonance of the power transmission passage 100 including the input shaft 32 and the first motor generator MG1 from occurring. In other words, as described above with reference to FIGS. 7B and 8, separating the first motor generator MG1 from the input shaft 32 reduces the inertia of the power transmission passage 100 and increases the natural frequency of the power transmission passage 100. Accordingly, it is possible to prevent the torsional resonance of the power transmission passage 100 from occurring.

HEV Mode: High Required Driving Power, High Gear

Figure 11:
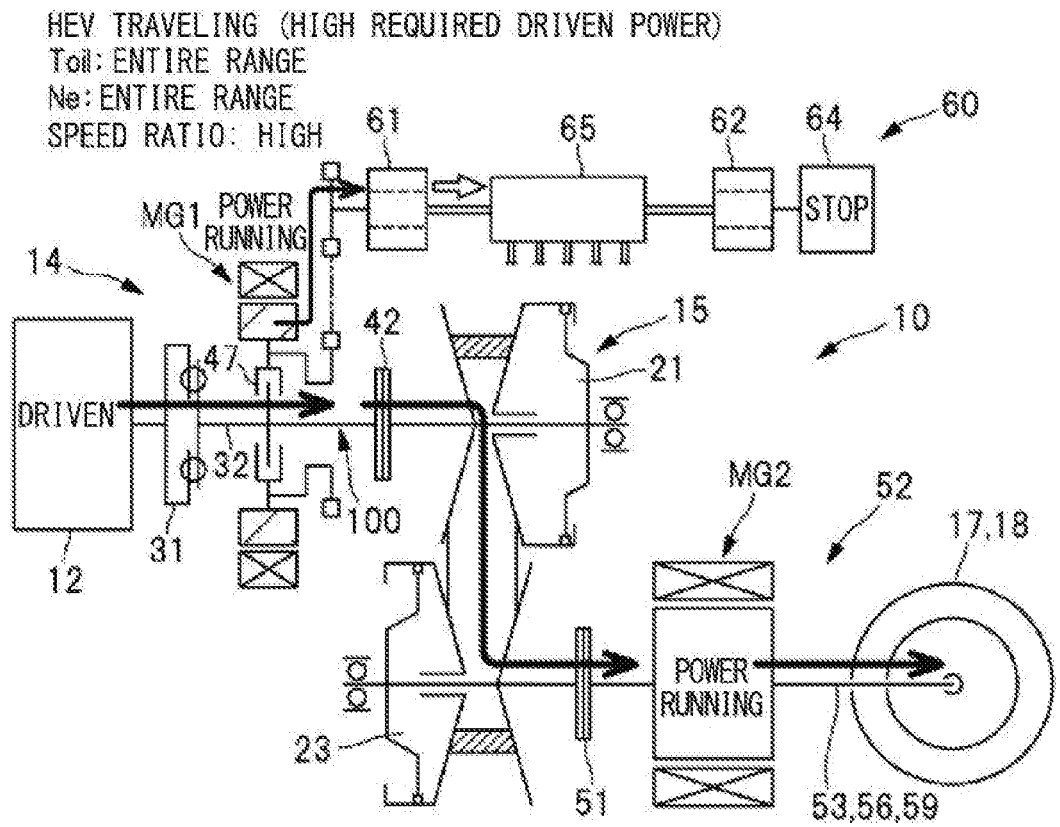
FIG. 11 is a schematic diagram illustrating an example operating state of the power train in the HEV mode.

FIG. 11 illustrates an example operating state of the power train 14 in the HEV mode. In the situation illustrated in FIG. 11, the required driving power for the power train 14 is high, the speed ratio of the continuously variable transmission 15 is set on the high side, and the vehicle 11 is accelerating. Thick arrows in FIG. 11 each indicate the flow of the engine torque and the motor torque.

In the HEV mode illustrated in FIG. 11, the forward clutch 42 and the output clutch 51 may both be switched to the engaged state. As described above, the required driving power for the power train 14 is high, and the speed ratio of the continuously variable transmission 15 is set on the high side; therefore, the engine 12 may be switched to the driven state, and the second motor generator MG2 may be switched to the power running state. Accordingly, the wheels 17 and 18 may be driven by the engine 12 and the second motor generator MG2.

In the foregoing example illustrated in FIG. 10A, the speed ratio may be set on the low side, and the input shaft 32 may be driven by the first motor generator MG1. In contrast, in the example illustrated in FIG. 11, the speed ratio may be set on the high side, and the input shaft 32 may be separated from the first motor generator MG1 by releasing the motor clutch 47 on the basis of the output torque of the first motor generator MG1. This makes it possible to reduce the inertia of the power transmission passage 100 including the input shaft 32. Accordingly, it is possible to rapidly increase the rotational speed of the input shaft 32 by the engine torque, and to improve the acceleration performance of the vehicle 11.

In the situation illustrated in FIG. 11, the required driving power is high, and thus an increased amount of the hydraulic fluid may be consumed by the continuously variable transmission 15 and other components. Accordingly, the first oil pump 61 may be driven by the first motor generator MG1, causing the hydraulic oil to be supplied from the first oil pump 61 to the valve body 65, as indicated by a hollow arrow in FIG. 11.

As described above, in the HEV mode in which the required driving power is high and the speed ratio is set on the high side, the motor clutch 47 may be switched to the released state. This separates the first motor generator MG1 from the input shaft 32. Accordingly, it is possible to reduce the inertia of the power transmission passage 100 and improve the acceleration performance of the vehicle 11. Further, separating the first motor generator MG1 from the input shaft 32 reduces the inertia of the power transmission passage 100 and increases the natural frequency of the power transmission passage 100, as described above with reference to FIGS. 7B and 8. Accordingly, it is possible to prevent the torsional resonance of the power transmission passage 100 from occurring.

HEV Mode: Power Generation by MG1

Figure 12:
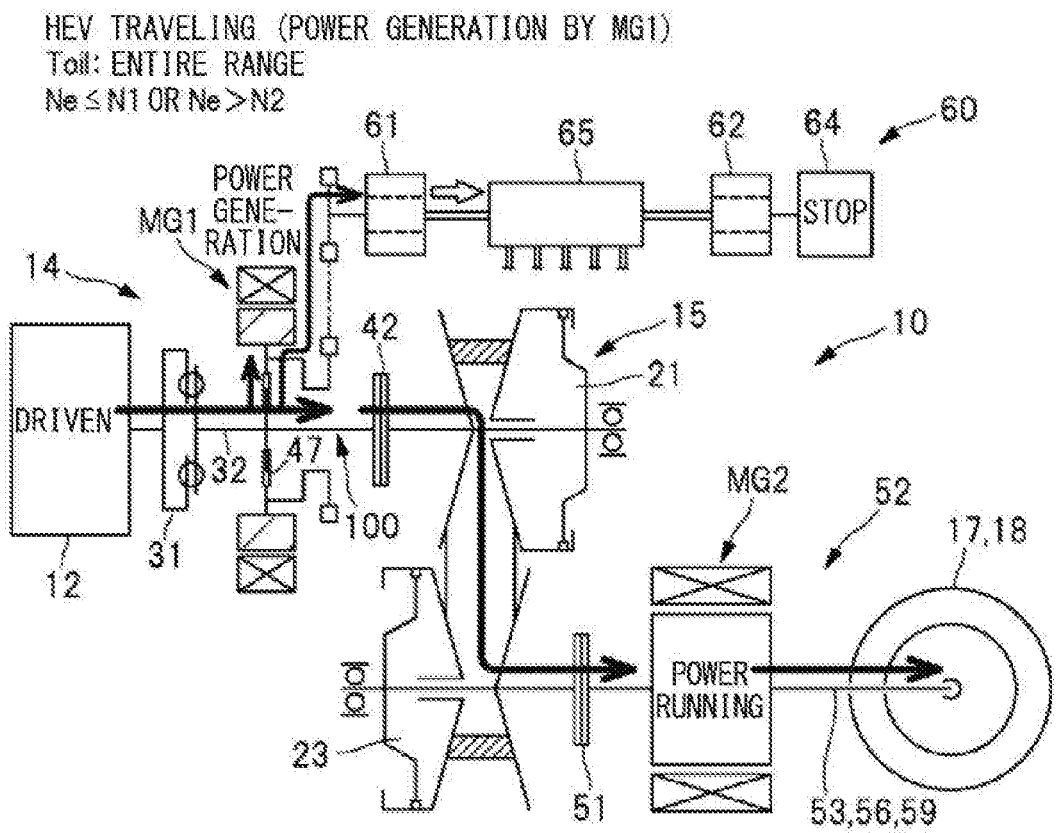
FIG. 12 is a schematic diagram illustrating an example operating state of the power train in the HEV mode.
Figure 13:
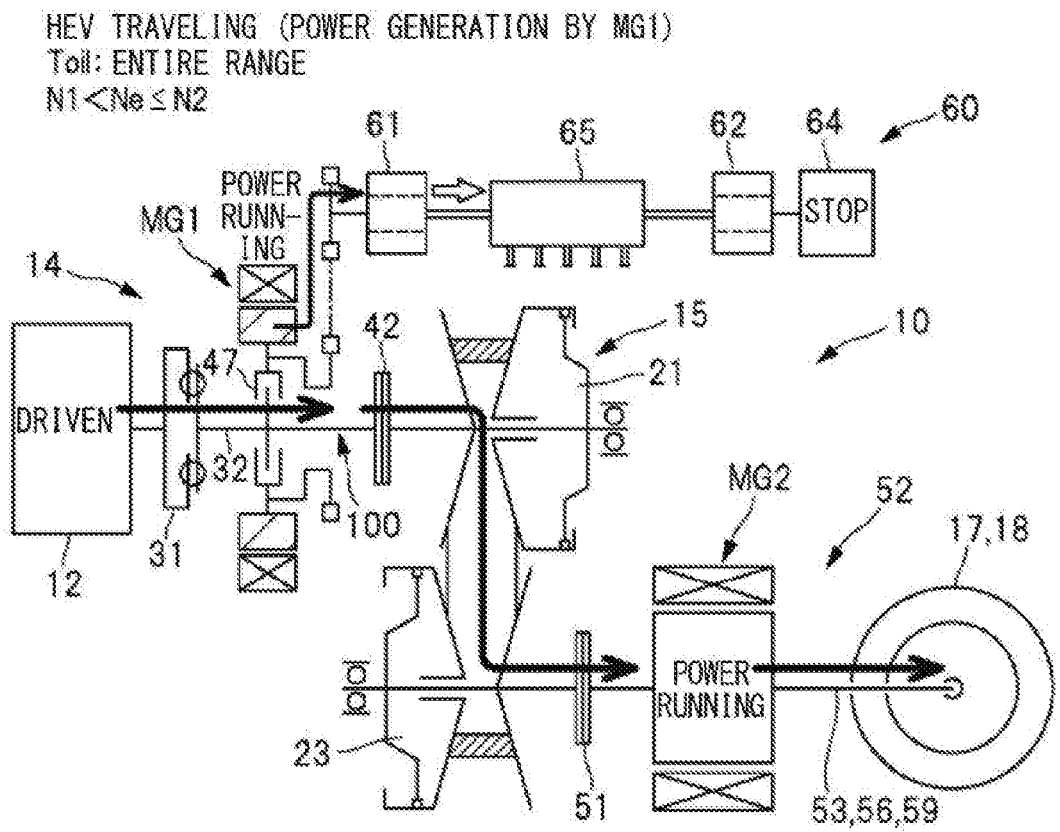
FIG. 13 is a schematic diagram illustrating an example operating state of the power train in the HEV mode.

The HEV mode in which the first motor generator MG1 is switched to a power generation state will now be described. FIGS. 12 and 13 illustrate example operating state of the power train 14 in the HEV mode. FIG. 12 illustrates an example situation where the engine revolution number Ne is equal to or less than the predetermined revolution number N1 or where the engine revolution number Ne is greater than a predetermined revolution number N2 that is greater than the predetermined revolution number N1. FIG. 13 illustrate an example situation where the engine revolution number Ne is greater than the predetermined revolution number N1 and equal to or less than the predetermined revolution number N2. In one embodiment, the predetermined revolution number N1 may serve as a "first revolution number". In one embodiment, the predetermined revolution number N2 may serve as a "second revolution number".

In the HEV mode illustrated in FIG. 12, the forward clutch 42 and the output clutch 51 may both be switched to the engaged state. To bring the first motor generator MG1 into a power generation state, the motor clutch 47 may be switched to the engaged state to couple the first motor generator MG1 to the engine 12. The engine 12 may then cause the rotational driving of the first motor generator MG1 to bring the first motor generator MG1 into the power generation state. Because the motor clutch 47 is in the engaged state, the first oil pump 61 may be driven by the engine 12, causing the hydraulic fluid to be supplied from the first oil pump 61 to the valve body 65, as indicated by a hollow arrow in FIG. 12.

In a case where the engine revolution number Ne increases to a value greater than the predetermined revolution number N1 in the situation illustrated in FIG. 12, or in a case where the engine revolution number Ne decreases to a value equal to or less than the predetermined revolution number N2 in the situation illustrated in FIG. 12, the motor clutch 47 may be switched to the released state to prevent the torsional resonance from occurring, as illustrated in FIG. 13. In other words, in a case where the engine revolution number Ne is in a resonance range $\alpha$ in which the engine revolution number Ne is greater than the predetermined revolution number N1 and equal to or less than the predetermined revolution number N2, the motor clutch 47 may be switched to the released state. In association with the release of the motor clutch 47, the transmission of the engine power to the first oil pump 61 may be interrupted; however, the first oil pump 61 may be kept rotating by the first motor generator MG1 in the power running state. This allows the first oil pump 61 to keep supplying the hydraulic fluid to the valve body 65 even after the motor clutch 47 is released.

As described above, in a case where the engine revolution number Ne is greater than the predetermined revolution number N1 and equal to or less than the predetermined revolution number N2, the motor clutch 47 may be switched to the released state. This separates the first motor generator MG1 from the input shaft 32 to prevent the torsional resonance of the power transmission passage 100 including the input shaft 32 and the first motor generator MG1 from occurring. In other words, separating the first motor generator MG1 from the input shaft 32 reduces the inertia of the power transmission passage 100 and increases the natural frequency of the power transmission passage 100. Accordingly, it is possible to prevent the torsional resonance of the power transmission passage 100 from occurring.

Figure 14:
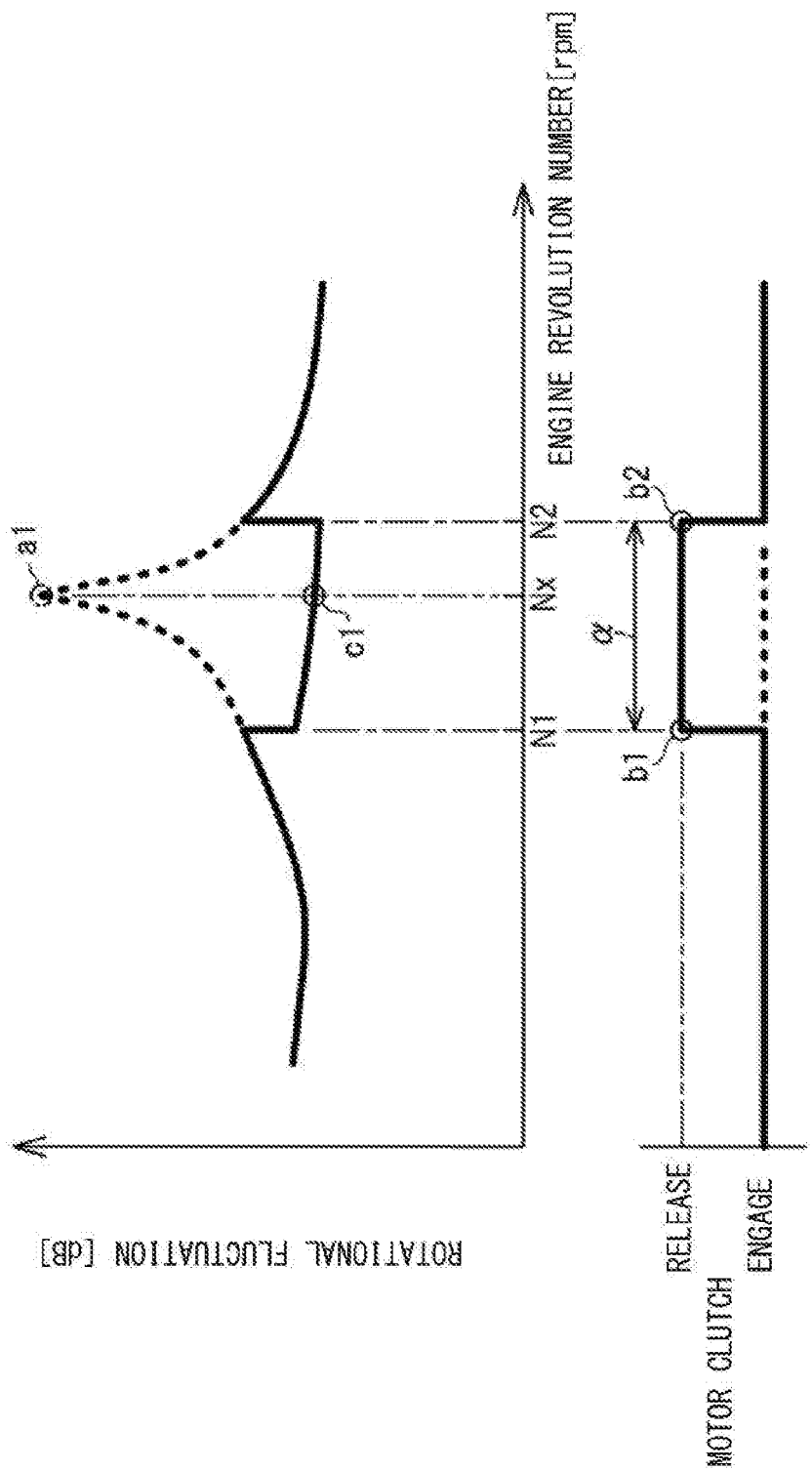
FIG. 14 illustrates rotational fluctuations generated in the vehicle including the power train.

FIG. 14 illustrates rotational fluctuations generated in the vehicle 11 including the power train 14. If the motor clutch 47 is held in the engaged state in a region indicated by a broken line in FIG. 14 in which the engine revolution number Ne is greater than the predetermined revolution number N1 and equal to or less than the predetermined revolution number N2, the power transmission passage 100 can generate torsional resonance at the resonance revolution number Nx between the predetermined revolution number N1 and the predetermined revolution number N2, as indicated by a reference character a1. The torsional resonance can generate noises such as gear rattle noises or booming noises.

To address such a concern, the vehicle driving apparatus 10 according to the example embodiment may switch the motor clutch 47 to the released state, as indicated by reference characters b1 and b2, when the engine revolution number Ne becomes greater than the predetermined revolution number N1 and equal to or less than the predetermined revolution number N2. Releasing the motor clutch 47 may separate the second motor generator MG2 from the power transmission passage 100, which reduces the inertia of the power transmission passage 100 and increases the natural frequency of the power transmission passage 100. Accordingly, it is possible to prevent the torsional resonance of the power transmission passage 100 from occurring, as indicated by a reference character c1 in FIG. 14, and thus to prevent noises such as gear rattle noises or booming noises from being generated due to the torsional resonance of the power transmission passage 100.

Further, as illustrated in FIG. 2, the power train 14 may include the first motor generator MG1 provided between the damper mechanism 31 and the forward/backward movement changeover mechanism 40, and the input shaft 32 may extend through the first motor generator MG1. This structure can require a longer input shaft 32 extending through the first motor generator MG1; it thus has been difficult to strengthen the stiffness of the input shaft 32 and increase the natural frequency in order to prevent the torsional resonance of the power transmission passage 100 from occurring. To address such a concern, the vehicle driving apparatus 10 according to the example embodiment may release the motor clutch 47 on the basis of the engine revolution number Ne. This makes it possible to reduce the inertia of the power transmission passage 100 and increase the natural frequency of the power transmission passage 100 in the revolution range in which the power transmission passage 100 can generate the torsional resonance. Accordingly, it is possible to prevent the torsional resonance of the power transmission passage 100 from occurring.

Another Example Embodiment 1/HEV Mode: Power Generation by MG1

Figure 15A:
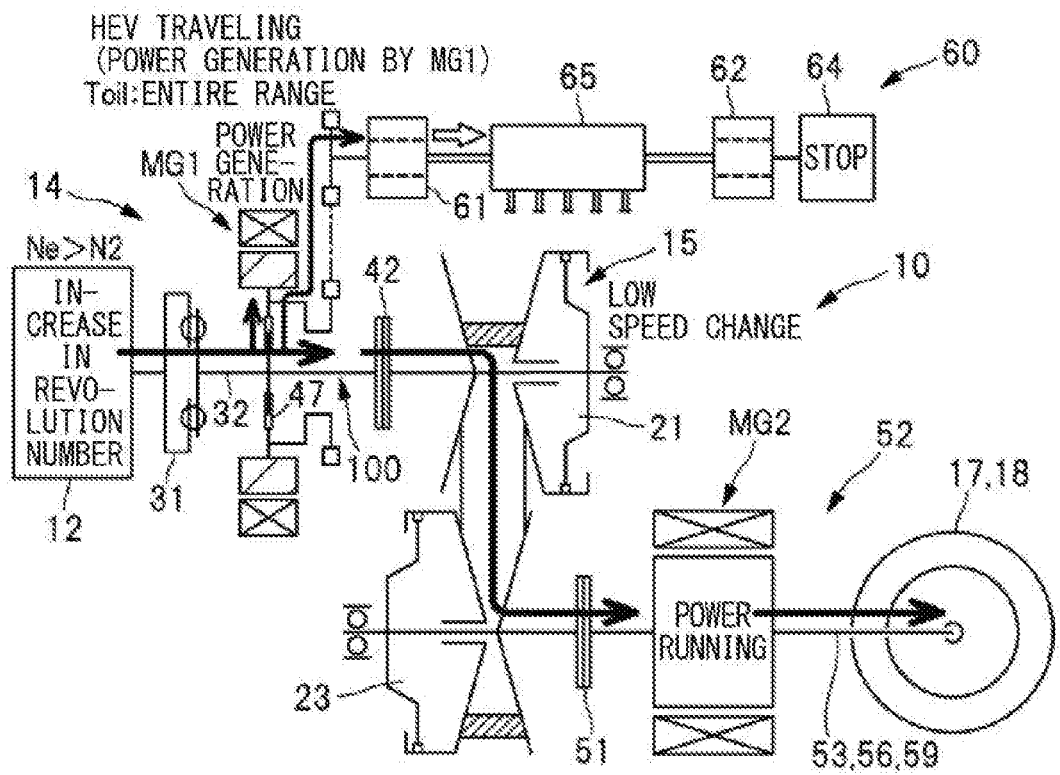
FIG. 15A is a schematic diagram illustrating an example operating state of the power train in the HEV mode.
Figure 15B:
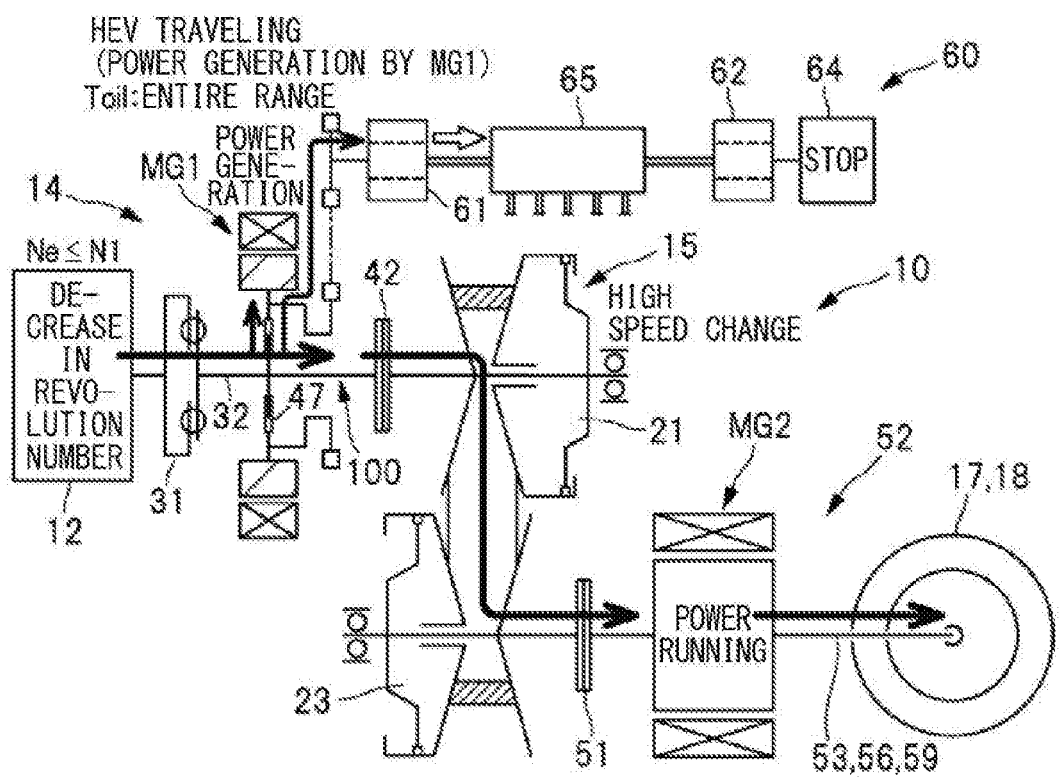
FIG. 15B is a schematic diagram illustrating an example operating state of the power train in the HEV mode.

In the examples illustrated in FIGS. 12 and 13, the power generation by the first motor generator MG1 may be stopped in a case where the engine revolution number Ne is greater than the predetermined revolution number N1 and equal to or less than the predetermined revolution number N2. However, these examples are non-limiting examples, and the power generation by the first motor generator MG1 may be maintained by another control method. FIGS. 15A and 15B illustrate example operating states of the power train 14 in the HEV mode.

In a case where the engine revolution number Ne increases or decrease to a value within the resonance range $\alpha$ between the predetermined revolution numbers N1 and N2 in the situation illustrated in FIG. 12 described above, the torsional resonance of the power transmission passage 100 is prevented from occurring while the power generation by the first motor generator MG1 is maintained. Accordingly, as illustrated in FIGS. 15A and 15B, the continuously variable transmission 15 may execute the speed-change control while the motor clutch 47 is kept in the engaged state.

That is, in a case where the engine revolution number Ne is in the resonance range $\alpha$ between the predetermined revolution numbers N1 and N2, the speed ratio of the continuously variable transmission 15 may be set on the low side while the motor clutch 47 is kept in the engaged state, as illustrated in FIG. 15A. This allows the primary shaft 20 to increase in the rotational speed while maintaining the rotational speed of the secondary shaft 22. In other words, the engine revolution number Ne may be increased to a value greater than the predetermined revolution number N2 while the vehicle speed is maintained. In this way, the engine revolution number Ne may be increased to a value out of the resonance range α to prevent the torsional resonance of the power transmission passage 100 from occurring while the motor clutch 47 is kept in the engaged state and the power generation by the first motor generator MG1 is maintained.

In the example embodiment described above, the speed ratio of the continuously variable transmission 15 is set on the low side; however, the speed ratio of the continuously variable transmission 15 may be set to the high side depending on the traveling state. For example, in a case where the engine revolution number Ne is within the resonance range α between the predetermined revolution numbers N1 and N2, the speed ratio of the continuously variable transmission 15 may be set on the high side while the motor clutch 47 is kept in the engaged state, as illustrated in FIG. 15B. This allows the primary shaft 20 to decrease in the rotational speed while maintaining the rotational speed of the secondary shaft 22. In other words, the engine revolution number Ne may be reduced to a value equal to or less than the predetermined revolution number N1 while the vehicle speed is maintained. In this way, the engine revolution number Ne may be reduced to a value out of the resonance range α to prevent the torsional resonance of the power transmission passage 100 from occurring while the motor clutch 47 is kept in the engaged state and the power generation by the first motor generator MG1 is maintained.

Another Example Embodiment 2/HEV Mode: Power Generation by MG1

Figure 16:
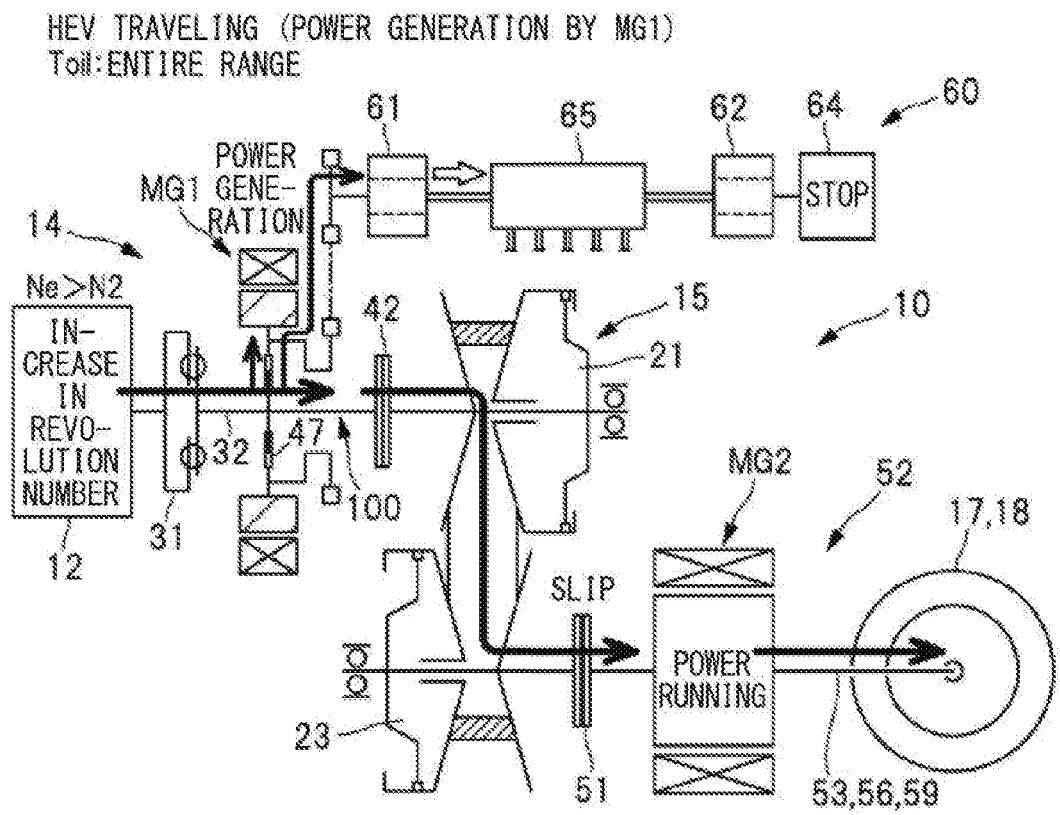
FIG. 16 is a schematic diagram illustrating an example operating state of the power train in the HEV mode.

In the examples illustrated in FIGS. 12 and 13, the power generation by the first motor generator MG1 may be stopped in a case where the engine revolution number Ne is greater than the predetermined revolution number N1 and equal to or less than the predetermined revolution number N2. However, these examples are non-limiting examples, and the power generation by the first motor generator MG1 may be maintained by another control method. FIG. 16 illustrates an example operating state of the power train 14 in the HEV mode.

In a case where the engine revolution number Ne increases or decreases to a value within the resonance range α between the predetermined revolution numbers N1 and N2 in the situation illustrated in FIG. 12 described above, the output clutch 51 serving as a friction clutch may be switched to the slip state, and the engine revolution number Ne may be increased by increasing the engine output while the motor clutch 47 is kept in the engaged state, as illustrated in FIG. 16. This allows the engine revolution number Ne to increase to a value greater than the predetermined revolution number N2 while maintaining the vehicle speed. In other words, the engine revolution number Ne may be increased to a value out of the resonance range α to prevent the torsional resonance of the power transmission passage 100 from occurring while the motor clutch 47 is kept in the engaged state and the power generation by the first motor generator MG1 is maintained.

While the output clutch 51 is kept in the slip state, the temperature of the output clutch 51 may increase. In a case where the temperature of the output clutch 51 is higher than a predetermined temperature or where the output clutch 51 is kept in the slip state for a predetermined time, the output clutch 51 may be switched to the engaged state to cool the output clutch 51, and the motor clutch 47 may be switched to the released state to temporarily stop the power generation by the first motor generator MG1, as illustrated in FIG. 13.

In a case where the temperature of the output clutch 51 is equal to or lower than the predetermined temperature or where the output clutch 51 is kept in the engaged state for a predetermined time, the output clutch 51 may be switched to the slip state again, and the motor clutch 47 may be switched to the engaged state to restart the power generation by the first motor generator MG1, as illustrated in FIG. 16. That is, the power train 14 may be repeatedly switched between the operating state illustrated in FIG. 16 and the operating state illustrated in FIG. 13 in an alternate manner. This allows the first motor generator MG1 to keep generating electric power without causing the torsional resonance of the power transmission passage 100.

The example embodiments of the technology described above are non-limiting examples, and various modifications may be made in the example embodiments within the scope of the technology. Although the power train 14 may be used to drive all of the wheels in the examples illustrated in the drawings, this is a non-limiting example. Alternatively, the power train 14 may be used to drive only a front wheel or a rear wheel. Further, although the continuously variable transmission 15 may be used as a transmission mechanism in the example embodiments described above, this is a non-limiting example. Alternatively, an automatic transmission of a planetary gear type or a parallel shaft type may be used as a transmission mechanism. Although the forward clutch 42 and the output clutch 51 may both be switched to the released state in the EV mode in the example illustrated in FIG. 3, this is a non-limiting example. Alternatively, either one of the forward clutch 42 and the output clutch 51 may be switched to the released state in the EV mode. For example, the EV mode may be performed while the rotational driving of the continuously variable transmission 15 is kept by engaging the output clutch 51 and releasing the forward clutch 42. In this case, the forward clutch 42 may operate in the power running state. Still alternatively, the EV mode may be performed by engaging the forward clutch 42 and releasing the output clutch 51. In this case, the output clutch 51 may serve as a mode switching clutch.

According to at least one example embodiment of the technology, the vehicle driving apparatus includes the input shaft coupled to the crank shaft of the engine via the damper mechanism, the power generation motor provided with the hollow rotor through which the input shaft extends, and the motor clutch configured to release the coupling between the input shaft and the hollow rotor. The motor clutch makes it possible to separate the hollow rotor from the input shaft. Accordingly, it is possible to prevent the torsional resonance of the input shaft from occurring with a simple structure.

It should be appreciated that the foregoing example embodiments of the technology described merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

The invention claimed is:
1. A vehicle driving apparatus for a vehicle with wheels, the apparatus comprising:
an engine;
a transmission mechanism disposed between the engine and the wheels;

an input shaft disposed between the engine and the transmission mechanism and coupled to a crank shaft of the engine via a damper mechanism;
a power generation motor disposed between the engine and the transmission mechanism and including a hollow rotor through which the input shaft extends;
a motor clutch configured to be switched between an engaged state and a released state, the motor clutch coupling the input shaft and the hollow rotor when being in the engaged state, the motor clutch releasing the coupling between the input shaft and the hollow rotor when being in the released state; and
a clutch controller configured to switch the motor clutch between the engaged state and the released state on a basis of engine revolution number of the engine, wherein the clutch controller is configured to:
switch the motor clutch to the engaged state in a case where the engine revolution number is equal to or less than a first revolution number or when the engine revolution number is greater than a second revolution number, the second revolution number being greater than the first revolution number, and
switch the motor clutch to the released state in a case where the engine revolution number is greater than the first revolution number and equal to or less than the second revolution number.

2. The vehicle driving apparatus according to claim 1, further comprising:
a traveling motor coupled to the wheels via output shafts; and
a mode switching clutch disposed between the input shaft and the output shafts and configured to be switched between an engaged state and a released state by the clutch controller, the mode switching clutch coupling the input shaft and the output shafts in the engaged state, the mode switching clutch releasing the coupling between the input shaft and the output shafts in the released state, wherein
the clutch controller is configured to
switch the mode switching clutch to the engaged state when an engine traveling mode in which the vehicle travels using the engine is executed, and
switch the mode switching clutch to the released state when a motor traveling mode in which the vehicle travels using the traveling motor is executed.

3. The vehicle driving apparatus according to claim 2, further comprising:
an oil pump coupled to the power generation motor and configured to discharge hydraulic fluid; and
a motor controller configured to control the power generation motor, wherein
the clutch controller is configured to switch the motor clutch from the engaged state to the released state and the motor controller is configured to switch the power generation motor from the power generation state to a power running state to cause the oil pump keep rotating, in a case where the engine revolution number increases to a value greater than the first revolution number while the engine traveling mode is executed and the power generation motor is switched to a power generation state.

4. The vehicle driving apparatus according to claim 3, wherein
the clutch controller is configured to switch the motor clutch from the released state to the engaged state and the motor controller is configured to switch the power generation motor from the power running state to the power generation state, in a case where: the engine revolution number increases to a value greater than the second revolution number after the engine revolution number increases to the value greater than the first revolution number; the motor clutch is switched from the engaged state to the released state; and the power generation motor is switched from the power generation state to the power running state.

5. The vehicle driving apparatus according to claim 2, further comprising:
a transmission controller configured to control the transmission mechanism; and
an engine controller configured to control the engine, wherein
the transmission controller is configured to set a speed ratio of the transmission mechanism on a low side and the engine controller is configured to increase the engine revolution number to a value greater than the second revolution number, in a case where the engine revolution number is greater than the first revolution number and equal to or less than the second revolution number while the engine traveling mode is executed and the power generation motor is switched to a power generation state.

6. The vehicle driving apparatus according to claim 2, further comprising:
a transmission controller configured to control the transmission mechanism; and
an engine controller configured to control the engine, wherein
the transmission controller is configured to set a speed ratio of the transmission mechanism on a high side and the engine controller is configured to reduce the engine revolution number to a value equal to or less than the first revolution number, in a case where the engine revolution number is greater than the first revolution number and equal to or less than the second revolution number while the engine traveling mode is executed and the power generation motor is switched to a power generation state.

7. The vehicle driving apparatus according to claim 2, further comprising:
a second clutch controller configured to control the mode switching clutch; and
an engine controller configured to control the engine, wherein
the second clutch controller is configured to switch the mode switching clutch to a slip state and the engine controller is configured to increase the engine revolution number to a value greater than the second revolution number, in a case where the engine revolution number is greater than the first revolution number and equal to or less than the second revolution number while the engine traveling mode is executed and the power generation motor is switched to a power generation state.

8. The vehicle driving apparatus according to claim 1, wherein the damper mechanism is devoid of a friction plate.

9. The vehicle driving apparatus according to claim 1, wherein the damper mechanism transmits a torque between an input plate and an output plate only via springs that are assembled with the input plate and the output plate.

10. The vehicle driving apparatus according to claim 9, wherein the damper mechanism is devoid of a friction plate.

* * * * *